US012764576B2

(12) United States Patent
Wang et al.

(10) Patent No.: US 12,764,576 B2
(45) Date of Patent: Oct. 13, 2026

(54) POSITIONING INFORMATION PROCESSING METHOD, TERMINAL DEVICE AND NETWORK DEVICE

(71) Applicant: VIVO MOBILE COMMUNICATION CO., LTD., Chang'an Dongguan (CN)

(72) Inventors: Yuanyuan Wang, Chang'an Dongguan (CN); Huaming Wu, Chang'an Dongguan (CN); Ye Si, Chang'an Dongguan (CN); Zixun Zhuang, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 959 days.

(21) Appl. No.: 17/961,251

(22) Filed: Oct. 6, 2022

(65) Prior Publication Data

US 2023/0031604 A1 Feb. 2, 2023

Related U.S. Application Data

(63) Continuation of application No. PCT/CN2021/087778, filed on Apr. 16, 2021.

(30) Foreign Application Priority Data

Apr. 17, 2020 (CN) ......................... 202010307927.5

(51) Int. Cl.
*H04W 24/10* (2009.01)

(52) U.S. Cl.
CPC .................................. *H04W 24/10* (2013.01)

(58) Field of Classification Search
CPC ....... H04W 4/029; H04W 4/02; H04W 24/10; H04W 64/00
See application file for complete search history.

(56) References Cited

U.S. PATENT DOCUMENTS

2019/0014444 A1 1/2019 Lei et al.
2019/0166516 A1* 5/2019 Kim ...................... H04W 24/10
2020/0053686 A1 2/2020 Edge et al.

FOREIGN PATENT DOCUMENTS

CN 103200610 A 7/2013
CN 105611499 A 5/2016
(Continued)

OTHER PUBLICATIONS

International Patent Application No. PCT/CN2021/087778, International Search Report and Written Opinion with Partial English Machine Translation mailed Jul. 16, 2021, 9 pages.
(Continued)

*Primary Examiner* — Sam Bhattacharya
(74) *Attorney, Agent, or Firm* — Fredrikson & Byron, P.A.

(57) ABSTRACT

This application discloses a positioning information processing method, a terminal device, and a network device. The method includes: receiving a measurement condition and/or a reporting condition; and determining, according to first positioning information of a terminal device, whether to measure second positioning information of the terminal device and/or whether to report the first positioning information. In this application, reporting is not performed in a case that there is no need to perform reporting, so that power and positioning feedback resources of user equipment can be saved; and reporting is performed in a case that there is a need to perform reporting, so that precision of positioning information can be ensured.

20 Claims, 5 Drawing Sheets

(56) References Cited

FOREIGN PATENT DOCUMENTS

| | | | |
|---|---|---|---|
| CN | 109644423 | A | 4/2019 |
| CN | 110383873 | A | 10/2019 |
| CN | 110958630 | A | 4/2020 |

OTHER PUBLICATIONS

Hua Wei et al. "3GPP TSG-CT WG1 Meeting #122-e C1-200901" Update to Event-triggered location reporting procedure, Feb. 27, 2020 (Feb. 27, 2020), part 6.2.2, 3 pgs.

* cited by examiner

POSITIONING INFORMATION PROCESSING METHOD, TERMINAL DEVICE AND NETWORK DEVICE

CROSS-REFERENCE

This application is a continuation of International Application No. PCT/CN2021/087778, filed on Apr. 16, 2021, which claims priority to Chinese Patent Application No. 202010307927.5, filed with the China National Intellectual Property Administration on Apr. 17, 2020 and entitled "POSITIONING INFORMATION PROCESSING METHOD, TERMINAL DEVICE AND NETWORK DEVICE", which are incorporated herein by reference in their entireties.

TECHNICAL FIELD

Embodiments of the present disclosure relate to the communications field, and in particular, to a positioning information processing method, a terminal device, and a network device.

BACKGROUND

Currently, measurement and/or reporting of positioning information of a mobile terminal are/is mainly performed in two processing manners. A first manner is periodic measurement and/or reporting, where in a case that a time interval between a current time and a time at which the positioning information was last measured and/or reported exceeds a time period T, the positioning information of the mobile terminal is measured and/or reported. A second manner is immediate requesting, where in a case that a measurement and/or reporting request are/is received, the positioning information of the mobile terminal is immediately measured and/or reported.

However, in the foregoing two manners, power and positioning feedback resources of user equipment (UE) such as a mobile terminal may be wasted in some cases, and precision of positioning information cannot be ensured.

SUMMARY

According to a first aspect of the present disclosure, a positioning information processing method is provided, where the method is performed by a communications device, and the method includes: determining, according to first positioning information of a terminal device, whether to measure second positioning information of the terminal device and/or whether to report the first positioning information.

According to a second aspect of the present disclosure, a positioning information processing method is provided, where the method is performed by a network device, and the method includes: sending a measurement condition and/or a reporting condition.

According to a third aspect of the present disclosure, a communications device is provided, including: a processing module, configured to determine, according to first positioning information of a terminal device, whether to measure second positioning information of the terminal device and/or whether to report the first positioning information.

According to a fourth aspect of the present disclosure, a network device is provided, including a transceiver module, configured to send a measurement condition and/or a reporting condition.

According to a fifth aspect of the present disclosure, a terminal device is provided, where the terminal device includes a processor, a memory, and a computer program that is stored in the memory and that can be run on the processor, where when the computer program is executed by the processor, the steps of the positioning information processing method in the first aspect are implemented.

According to a sixth aspect of the present disclosure, a network device is provided, where the network device includes a processor, a memory, and a computer program that is stored in the memory and that can be run on the processor, where when the computer program is executed by the processor, the steps of the positioning information processing method in the first aspect or the second aspect are implemented.

According to a seventh aspect of the present disclosure, a computer-readable storage medium is provided. The computer-readable storage medium stores a computer program, and when the computer program is executed by a processor, the steps of the positioning information processing method in the first aspect and/or the second aspect are implemented.

BRIEF DESCRIPTION OF DRAWINGS

The accompanying drawings described herein are intended to provide a further understanding of the present disclosure, and constitute a part of the present disclosure. The illustrative embodiments of the present disclosure and descriptions thereof are intended to describe the present disclosure, and do not constitute limitations on the present disclosure. In the accompanying drawings.

DESCRIPTION OF EMBODIMENTS

Figure 1:
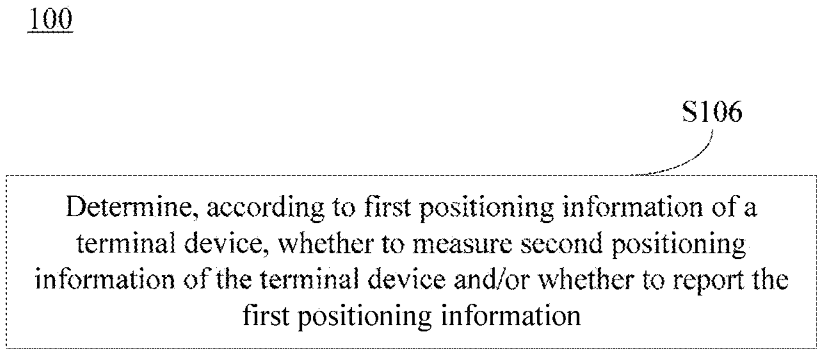
FIG. 1 is a schematic flowchart of a positioning information processing method according to an embodiment of the present disclosure.

To make the objectives, technical solutions, and advantages of this application clearer, the following clearly describes the technical solutions of this application with reference to the specific embodiments and the corresponding accompanying drawings in this application. Apparently, the described embodiments are merely some but not all of the embodiments of this application. All other embodiments obtained by a person of ordinary skill in the art based on the embodiments of this application without creative efforts shall fall within the protection scope of this application. "And/or" in the embodiments of this specification represents at least one of the two.

It should be understood that the technical solutions in the embodiments of the present disclosure may be applied to various communications systems, for example, a Long Term Evolution (LTE) system, an LTE frequency division duplex (FDD) system, an LTE time division duplex (TDD) system, a universal mobile telecommunication system (UMTS) or a worldwide interoperability for microwave access (WiMAX) communications system, a 5G system, or a new radio (New Radio, NR) system, or a subsequent evolved communications system.

In the embodiments of this application, a terminal device may include but is not limited to a mobile station (MS), a mobile terminal (Mobile Terminal), a mobile telephone (Mobile Telephone), user equipment, a handset (handset), portable equipment (portable equipment), a vehicle (vehicle), and the like. The terminal device may communicate with one or more core networks by using a radio access network (RAN). For example, the terminal device may be a mobile telephone (or referred to as a "cellular" telephone), or a computer having a wireless communication function; or the terminal device may be a portable, pocket-sized, handheld, computer built-in, or in-vehicle mobile apparatus.

In the embodiments of the present disclosure, network devices may include a first network device and a second network device. The first network device may be an apparatus deployed in a radio access network to provide a wireless communication function for a terminal device. The first network device may be a base station, and the base station may include various forms such as a macro base station, a micro base station, a relay station, and an access point. In systems that use different radio access technologies, devices that have a base station function may have different names. For example, the first network device is referred to as an evolved NodeB (Evolved NodeB, eNB or eNodeB) in an LTE network, a NodeB (NodeB) in a 3rd Generation (3rd Generation, 3G) network, or a network device in a subsequent evolved communications system. However, the terms do not constitute a limitation. The second network device may also be a base station, and the base station may include various forms such as a macro base station, a micro base station, a relay station, and an access point. In addition, the second network device may be alternatively a core network device, such as a location management function (LMF).

As shown in FIG. 1, an embodiment of the present disclosure provides a positioning information processing method 100. The method is performed by a communications device, that is, may be performed by a terminal device and/or a first network device. The first network device may be, for example, a base station, a radio frequency head, or a transmission node. In other words, the method may be performed by software or hardware installed on a terminal device and/or a network device. The method includes the following steps.

S106: Determine, according to first positioning information of a terminal device, whether to measure second positioning information of the terminal device and/or whether to report the first positioning information.

Positioning information of a mobile terminal is requested to be measured and/or reported according to a periodic or immediate request. In a case that the first positioning information of the terminal device actually does not need to be reported, for example, in a case that displacement is very small, the positioning information of the mobile terminal also needs to be measured and/or reported according to the periodic or immediate request, and consequently power and positioning feedback resources of UE are wasted. In addition, in a case that the first positioning information of the terminal device actually needs to be reported, for example, in a case that a terminal device of an elderly or a child has relatively large displacement, if a measurement and/or reporting cycle is not reached or reporting and/or measurement requesting is not received, measurement and/or reporting are/is not performed, which cannot ensure precision of positioning information.

However, in this step, it is determined, according to the first positioning information of the terminal device, whether to measure the second positioning information of the terminal device and/or whether to report the first positioning information. In this way, measurement and/or reporting are/it not performed in a case that there is no need to perform measurement and/or reporting, thereby saving power and positioning feedback resources of user equipment; and/or reporting are/is triggered in a case that there is a need to perform measurement and/or reporting, thereby ensuring precision of positioning information.

Figure 2:
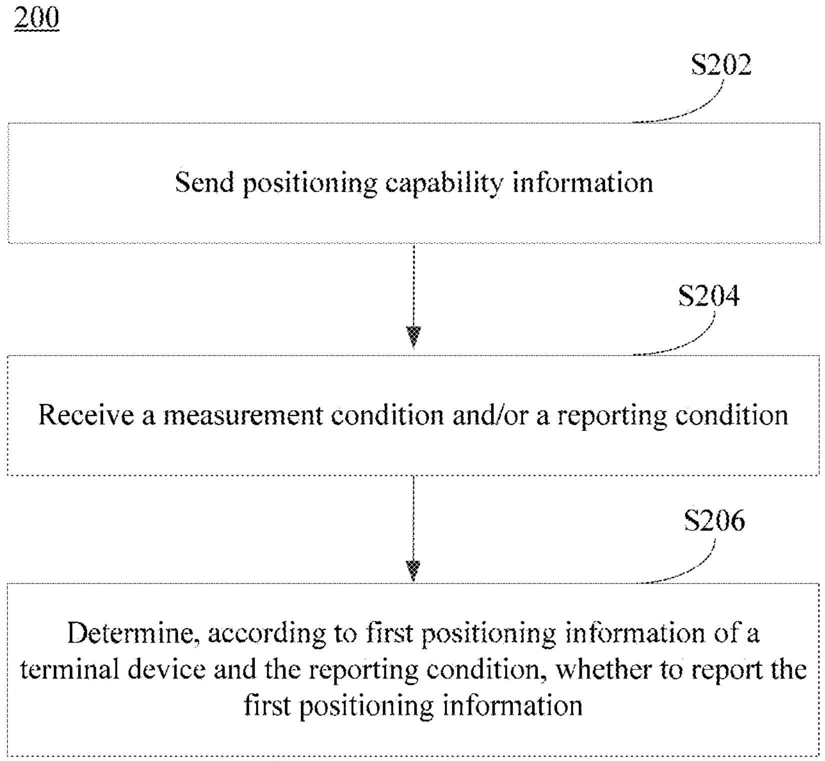
FIG. 2 is a schematic flowchart of a positioning information processing method according to another embodiment of the present disclosure.

As shown in FIG. 2, an embodiment of the present disclosure provides a positioning information processing method 200. The method is performed by a communications device, that is, may be performed by a terminal device and/or a first network device. The first network device may be, for example, a base station, a radio frequency head, or a transmission node. In other words, the method may be performed by software or hardware installed on a terminal device and/or a network device. The method includes the following steps.

S202: Send positioning capability information.

UE sends the positioning capability information to a second network device, for example, an LMF, where the positioning capability information is used to indicate whether triggering reporting is supported and/or whether releasing reporting is supported.

In an implementation, the UE may actively send the positioning capability information. In another implementation, the UE may receive a positioning capability information sending request from the LMF, and send a positioning capability information response to the LMF in response to sending of the positioning capability information request.

In an implementation, the UE may support releasing reporting in a predetermined case. For example, when performing intra-frequency or NR inter-frequency or radio access technology cell measurement according to a predetermined measurement rule, the UE may choose to perform releasing reporting.

S204. Receive a measurement condition and/or a reporting condition.

In an implementation, the measurement condition and/or the reporting condition are/is included in location request information. Alternatively, the second network device, for example, a location management function (LMF), may send the location request information to the terminal device and/or the first network device, where the location request information carries the measurement condition and/or the reporting condition. The measurement condition and/or the reporting condition are/is included in an LTE positioning protocol (LPP) or evolution thereof.

S206. Determine, according to first positioning information of the terminal device and the reporting condition, whether to report the first positioning information.

Descriptions of this step may be similar to those of step S106 in the embodiment in FIG. 1. For repeated descriptions, details are not described herein again.

In an implementation, the first positioning information of the terminal device includes at least one of location information, velocity information, angular velocity information, relative displacement, a relative velocity, a relative angular velocity, a reference signal time difference (RSTD) measurement value, a reference signal received power (RSRP) measurement value, a receive-transmit (Rx-Tx) measurement value, and an angle of arrival measurement value.

In an implementation, the reporting condition includes a triggering reporting condition and/or a releasing reporting condition, and the releasing reporting condition may be included in PeriodicalReportingCriteria. This step may include at least one of the following reporting manners.

Reporting manner 1: Report the first positioning information in a case that the first positioning information of the terminal device meets the triggering reporting condition.

The triggering reporting condition includes at least one of: being greater than or equal to a first relative displacement threshold, being greater than or equal to a first relative velocity threshold, being greater than or equal to a first relative angular velocity threshold, being greater than or equal to a first angle of arrival threshold, being greater than or equal to a first RSTD threshold, being greater than or equal to a first RSRP threshold, being greater than or equal to a first Rx-Tx threshold, a change in a wireless fidelity (Wi-Fi) node, a change in a Bluetooth node, a change in a receive beam, a change in a strongest energy incoming beam, or a change in a signal.

Alternatively, the case that the first positioning information of the terminal device meets the triggering reporting condition may include at least one of the following cases.

Case 1: In a case that the first positioning information of the terminal device is location information, if relative displacement between location information of the terminal device and a last reported location or a reference location is greater than or equal to a first relative displacement threshold, it is considered that the first positioning information of the terminal device meets the triggering reporting condition.

For example, a sensor of the terminal device obtains a quantity of steps corresponding to the terminal device, calculates the relative displacement between the terminal device and the last reported location or the reference location by using the quantity of steps, and reports the location information of the terminal when the relative displacement is greater than or equal to the first relative displacement threshold. In a scenario, for a specific target, for example, an elderly and a child, reporting of the first positioning information of the terminal may be triggered when displacement of the specific target is greater than or equal to the first relative displacement threshold, to facilitate location monitoring of the specific target. That is, relative displacement of the terminal may be relative displacement relative to the last reported location. In addition, the relative displacement of the terminal may be alternatively relative displacement relative to the reference location, for example, reporting is performed once a safe area is exceeded.

Case 2: In a case that the first positioning information of the terminal device is relative displacement, if relative displacement of the terminal device is greater than or equal to a first relative displacement threshold, it is considered that the first positioning information of the terminal device meets the triggering reporting condition. Optionally, the first positioning information of the terminal device may include an absolute value of relative displacement, a difference relative to last reported relative displacement, or a difference relative to a reference displacement value.

Case 3: In a case that the first positioning information of the terminal device is velocity information, if velocity information of the terminal device is greater than or equal to a first relative velocity threshold, it is considered that the first positioning information of the terminal device meets the triggering reporting condition. Optionally, the first positioning information of the terminal device may include an absolute value of a velocity, a difference relative to a last reported velocity, or a difference relative to a reference velocity.

Case 4: In a case that the first positioning information of the terminal device is angular velocity information, if angular velocity information of the terminal device is greater than or equal to a first relative angular velocity threshold, it is considered that the first positioning information of the terminal device meets the triggering reporting condition. Optionally, the first positioning information of the terminal device may include an absolute value of an angular velocity, a difference relative to a last reported angular velocity, or a difference relative to a reference angular velocity.

Case 5: In a case that the first positioning information of the terminal device is an RSTD measurement value, if an RSTD measurement value of the terminal device is greater than or equal to a first RSTD threshold, it is considered that the first positioning information of the terminal device meets the triggering reporting condition. Optionally, the first positioning information of the terminal device may include an absolute value of the RSTD measurement value, a difference relative to a last reported RSTD measurement value, or a difference relative to a reference RSTD measurement value.

Case 6: In a case that the first positioning information of the terminal device is an RSRP measurement value, if an RSRP measurement value of the terminal device is greater than or equal to a first RSRP threshold, it is considered that the first positioning information of the terminal device meets the triggering reporting condition. Optionally, the first positioning information of the terminal device may include an absolute value of the RSRP measurement value, a difference relative to a last reported RSRP measurement value, or a difference relative to a reference RSRP measurement value.

Case 7: In a case that the first positioning information of the terminal device is an Rx-Tx measurement value, if an Rx-Tx measurement value of the terminal device is greater than or equal to a first Rx-Tx threshold, it is considered that the first positioning information of the terminal device meets the triggering reporting condition. Optionally, the first positioning information of the terminal device may include an absolute value of the Rx-Tx measurement value, a difference relative to a last reported Rx-Tx measurement value, or a difference relative to a reference Rx-Tx measurement value.

Case 8: In a case that the first positioning information of the terminal device is an angle of arrival measurement value, if an angle of arrival measurement value of the terminal device is greater than or equal to a first angle of arrival threshold, it is considered that the first positioning information of the terminal device meets the triggering reporting condition. Optionally, the first positioning information of the terminal device may include the angle of arrival measurement value, a difference relative to a last reported angle of arrival measurement value, or a difference relative to a reference angle of arrival measurement value.

Case 9: In a case that it is determined, according to a location of the terminal device, that a Wi-Fi node corresponding to the terminal device changes, a Bluetooth node changes, a receive beam changes, a strongest energy incoming beam, or a signal changes, it is considered that the first positioning information of the terminal device meets the triggering reporting condition.

In a case that the first positioning information meets the triggering reporting condition, it is considered that the first positioning information of the terminal needs to be reported, thereby ensuring precision of positioning information of the terminal device.

Reporting manner 2: Report the first positioning information in a case that the first positioning information of the terminal device does not meet the releasing reporting condition.

The releasing reporting condition includes at least one of: being less than or equal to a second relative displacement threshold, being less than or equal to a second relative velocity threshold, being less than or equal to a second relative angular velocity threshold, being less than or equal to a second angle of arrival threshold, being less than or equal to a second RSTD threshold, being less than or equal to a second RSRP threshold, being less than or equal to a second Rx-Tx threshold, no change in a Wi-Fi node, no change in a Bluetooth node, no change in a receive beam, no change in a strongest energy incoming beam, or no change in a signal.

The case that the first positioning information of the terminal device does not meet the releasing reporting condition is similar to the foregoing cases 1 to 9, and details are not described herein again.

Alternatively, in a case that the first positioning information of the terminal device meets the releasing reporting condition, for example, displacement is less than the second relative displacement threshold, it may be considered that the first positioning information of the terminal device does not need to be reported. In this case, the first positioning information is not reported, thereby saving power and positioning feedback resources of the UE. On the contrary, the first positioning information is reported in a case that the first positioning information of the terminal device does not meet the releasing reporting condition, thereby ensuring precision of positioning information of the terminal device. For example, once it is determined that the terminal device is still or moves at a low speed, releasing reporting may be started according to motion state information.

Reporting manner 3: Report the first positioning information in a case that the first positioning information of the terminal device meets the releasing reporting condition and a time interval between a current time and a time at which the first positioning information was last reported exceeds a first time threshold.

Alternatively, if the first positioning information of the terminal device meets the releasing reporting condition, but the terminal device has not reported positioning information for a long time (beyond a first time threshold T1), the first positioning information needs to be reported to ensure precision of positioning information of the terminal device.

Reporting manner 4: Report the first positioning information in a case that the first positioning information of the terminal device is requested to be reported periodically and does not meet the releasing reporting condition.

The first positioning information is reported in a case that the first positioning information of the terminal device is requested to be reported periodically and does not meet the releasing reporting condition. On the contrary, in a case that the first positioning information of the terminal device is requested to be periodically reported, but the first positioning information of the terminal device meets the releasing reporting condition, for example, displacement is less than the second relative displacement threshold, the first positioning information may not be reported.

Reporting manner 5: Report the first positioning information in a case that the first positioning information of the terminal device is requested to be periodically reported and meets the releasing reporting condition, but a time interval between a current time and a time at which the first positioning information was last reported exceeds a first time threshold.

The first time threshold T1 may be a positive integer multiple of a time period t for periodical reporting.

Optionally, in this step, the first relative displacement threshold and the second relative displacement threshold are different. The first relative velocity threshold and the second relative velocity threshold are different. The first relative angular velocity threshold and the second relative angular velocity threshold are different. The first RSTD threshold and the second RSTD threshold are different. The first RSRP threshold and the second RSRP threshold are different. The first Rx-Tx threshold and the second Rx-Tx threshold are different.

Optionally, a value of the foregoing threshold is variable. In addition, it may be indicated, by using a specified parameter, whether releasing reporting at a higher priority frequency is allowed.

In an implementation, the first positioning information includes reporting time information. According to the reporting time, the second network device may distinguish a reporting condition corresponding to the first positioning information, where the reporting condition corresponding to the first positioning information is a triggering reporting condition, a releasing reporting condition, or periodical reporting. For example, when the reporting time information does not match the time period t for periodical reporting, the reporting condition corresponding to the first positioning information is a triggering reporting condition. When the reporting time information is an integer multiple of the time period t for periodical reporting, the reporting condition corresponding to the first positioning information is measurement in a case that the time interval between the current time and the time at which the first positioning information was last reported exceeds the first time threshold.

In an implementation, there is a correspondence between the first positioning information and the reporting condition.

For example, the first positioning information of the terminal device is location information or relative displacement, a triggering reporting condition corresponding to the location information or the relative displacement may be being greater than or equal to the first relative displacement threshold, and/or a releasing reporting condition corresponding to the location information or the relative displacement may be being less than or equal to the second relative displacement threshold. For example, the first positioning information of the terminal device is an RSTD measurement value, a triggering reporting condition corresponding to the RSTD measurement value may be being greater than or equal to the first RSTD threshold, and/or a releasing reporting condition corresponding to the RSTD measurement value may be being less than or equal to the second RSTD threshold. Examples are not enumerated herein.

In another implementation, the first positioning information may correspond to a reporting condition: a motion state of the terminal, for example, the terminal device that is still or moves at a low speed may perform releasing reporting. Alternatively, the first positioning information may correspond to a reporting condition: a relative location threshold.

In an implementation, the reporting condition is associated with a positioning manner of the terminal device, where the positioning manner of the terminal device includes at least one of an assisted-global navigation satellite system (A-GNSS), an observed time difference of arrival (Observed Time Difference Of Arrival, OTDOA), an enhanced cell identity (Enhanced Cell-ID, E-CID), sensor positioning, a wireless local area network (WLAN), Bluetooth (Bluetooth), a transport block size (TBS), a downlink (Downlink, DL)-TDOA, a DL-angle of departure (AoD), a multi-radio transmission technology (Multi-RTT), and an NR E-CID, an UL-TDOA, and an UL-angle of arrival (AoA).

In an implementation, the UL-TDOA and the UL-AoA may be reported by a base station. That is, in a case that the positioning manner is the UL-TDOA or the UL-AoA, the base station performs this step. In another implementation, the Multi-RTT, the NR E-CID, the UL-TDOA, and the UL-AoA may be reported by a base station, or the Multi-RTT and the NR E-CID may be reported by UE. That is, in a case that the positioning manner is one of the Multi-RTT, the NR E-CID, the UL-TDOA, and the UL-AoA, optionally, the base station may perform this step.

Alternatively, an association manner in which the reporting condition is associated with the positioning manner of the terminal device includes at least one of the following association manners:

Association manner 1: If the reporting condition is being greater than or equal to at least one of a relative displacement threshold, a relative velocity threshold, and a relative angular velocity threshold, the associated positioning manner of the terminal device is at least one of sensor positioning, an A-GNSS, an OTDOA, and a DL-TDOA.

The relative displacement threshold may include the first relative displacement threshold and/or the second relative displacement threshold. The relative velocity threshold may include the first relative velocity threshold and/or the second relative velocity threshold. The relative angular velocity threshold may include the first relative angular velocity threshold and/or the second relative angular velocity threshold.

Association manner 2: If the reporting condition is an RSTD threshold, the associated positioning manner of the terminal device is an OTDOA or a DL TDOA.

The RSTD threshold includes the first RSTD threshold and/or the second RSTD threshold.

Association manner 3: If the reporting condition is an RSRP threshold, the associated positioning manner of the terminal device is at least one of an OTDOA, an E-CID, a DL-TDOA, a DL-AoD, a Multi-RTT, an NR E-CID, and an UL-TDOA.

The RSRP threshold includes the first RSRP threshold and/or the second RSRP threshold.

Association manner 4: If the reporting condition is an Rx-Tx threshold, the associated positioning manner of the terminal device is a Multi-RTT.

The Rx-Tx threshold includes the first Rx-Tx threshold and/or the second Rx-Tx threshold.

Association manner 5: If the reporting condition is a change in a receive beam, a change in a strongest energy incoming beam, or a change in a signal, the associated positioning manner of the terminal device is an AoD.

Association manner 6: If the reporting condition is an angle of arrival threshold, the associated positioning manner of the terminal device is an UL-AoA.

Optionally, threshold values associated with different positioning manners may be the same or different. For example, the first relative displacement threshold associated with the A-GNSS and the first relative displacement threshold associated with the OTDOA may be the same or different. In an implementation, the positioning manner of the terminal device may be indicated by a value of a predetermined bit. For example, if a first bit of predetermined bits is 1, it may indicate that the positioning manner is an A-GNSS; if a second bit of the predetermined bits is 1, it may indicate that the positioning manner is an OTDOA; and if a third bit of the predetermined bits is 1, it may indicate that the positioning manner is an E-CID. Examples are not enumerated herein. In addition, with reference to the foregoing association manners 1 to 6, a corresponding reporting condition may be determined based on the positioning manner indicated by the predetermined bit, and a type of the corresponding first positioning information may be determined based on the reporting condition. For example, the type of the first positioning information is location information or velocity information.

In an implementation, whether the positioning manner of the terminal device supports a corresponding reporting condition may be indicated by a value of a predetermined bit. Alternatively, the value of the predetermined bit may be used to indicate at least one of the following content: whether the positioning manner of the terminal device supports triggering reporting, and/or whether the positioning manner of the terminal device supports releasing reporting.

For example, if a first bit of predetermined bits is 1, it may indicate that the positioning manner A-GNSS supports triggering reporting, and otherwise, if the first bit is 0, it indicates that the positioning manner A-GNSS does not support triggering reporting; if a second bit of the predetermined bits is 1, it may indicate that the positioning manner OTDOA supports triggering reporting, and otherwise, the second bit is 0, it indicates that the positioning manner OTDOA does not support triggering reporting. Examples are not enumerated herein. Specific values of the foregoing bits are only used as an example for description, and are not specifically limited in the protection scope of this solution. In an actual application process, a person skilled in the art may set specifics value of the bits according to an actual requirement without creative efforts.

In an implementation, there is a correspondence between the reporting condition and a positioning mode corresponding to a positioning manner of the terminal device, where the positioning mode corresponding to the positioning manner of the terminal device includes at least one of a user equipment-based (UE-based) mode, a user equipment-assisted (UE-assisted mode), and a standalone (standalone) mode. For example, if the reporting condition is being greater than or equal to at least one of a relative displacement threshold, a relative velocity threshold, and a relative angular velocity threshold, the positioning manner corresponds to the UE-based mode. For another example, if the reporting condition is an RSTD threshold, the positioning manner corresponds to the UE-assisted mode. Examples are not enumerated herein. Optionally, threshold values associated with different positioning modes may be the same or different.

In an implementation, the positioning mode may be indicated by a value of a predetermined bit. The bit used to indicate the positioning mode is different from the bit used to indicate the positioning manner. For example, if a first bit of predetermined bits is 1, it may indicate that the positioning mode is a standalone mode; if a second bit of the predetermined bits is 1, it may indicate that the positioning mode is a UE-based mode; and if a third bit of the predetermined bits is 1, it may indicate that the positioning mode is a UE-assisted mode. Examples are not enumerated herein. In addition, because there is a correspondence between the positioning mode and the reporting condition, after the positioning mode is determined according to the value of the predetermined bit, the reporting condition may be determined based on the determined positioning mode. Further, a type of the corresponding first positioning information may be determined based on the reporting condition. For example, the type of the first positioning information is location information or velocity information.

In an implementation, whether the positioning mode corresponding to the positioning manner of the terminal device supports a corresponding reporting condition may be indicated by a value of a predetermined bit. Alternatively, the value of the predetermined bit may be used to indicate whether the positioning mode corresponding to the positioning manner of the terminal device supports triggering reporting, and/or whether the positioning mode corresponding to the positioning manner of the terminal device supports releasing reporting. For example, if a first bit of predetermined bits is 1, it may indicate that the positioning mode standalone supports releasing reporting, and on the contrary, if the first bit is 0, it indicates that the positioning mode standalone does not support releasing reporting. Examples are not enumerated herein. Specific values of the foregoing bits are only used as an example for description, and are not specifically limited in the protection scope of this solution. In an actual application process, a person skilled in the art may perform setting according to an actual requirement without creative efforts.

In an implementation, in a case that the reporting condition is associated with the positioning manner of the terminal device, the positioning capability information sent in step S202 is used to indicate whether the positioning manner of the terminal device supports triggering reporting, and/or whether the positioning manner of the terminal device supports releasing reporting, which may be indicated by the foregoing bit. Details are not repeated herein. Therefore, a specific reporting condition to be used may be indicated in the positioning manner.

In an implementation, in a case that there is a correspondence between the positioning mode corresponding to the first positioning information and the reporting condition, the positioning capability information sent in step S202 is used to indicate whether the positioning mode supports triggering reporting, and/or whether the positioning mode supports releasing reporting, which may be indicated by the value of the predetermined bit. Details are not repeated herein.

In an implementation, an association manner and a triggering condition TriggeredReportingCriteria may be carried in common location request information CommonIEsRequestLocationInformation.

In another implementation, a specific reporting condition may be carried in specific location request information, such as location request information of a specific positioning manner of the terminal device.

Optionally, in an implementation solution, the communications device may select or report a desired reporting manner, a reporting condition, a reporting cycle, and the like.

Therefore, according to the positioning information processing method provided in this embodiment of the present disclosure, it is determined, according to first positioning information of a terminal device and a reporting condition, whether to report the first positioning information. In this way, reporting it not performed in a case that there is no need to perform reporting, thereby saving power and positioning feedback resources of user equipment; and reporting is performed in a case that there is a need to perform reporting, thereby ensuring precision of positioning information.

Figure 3:
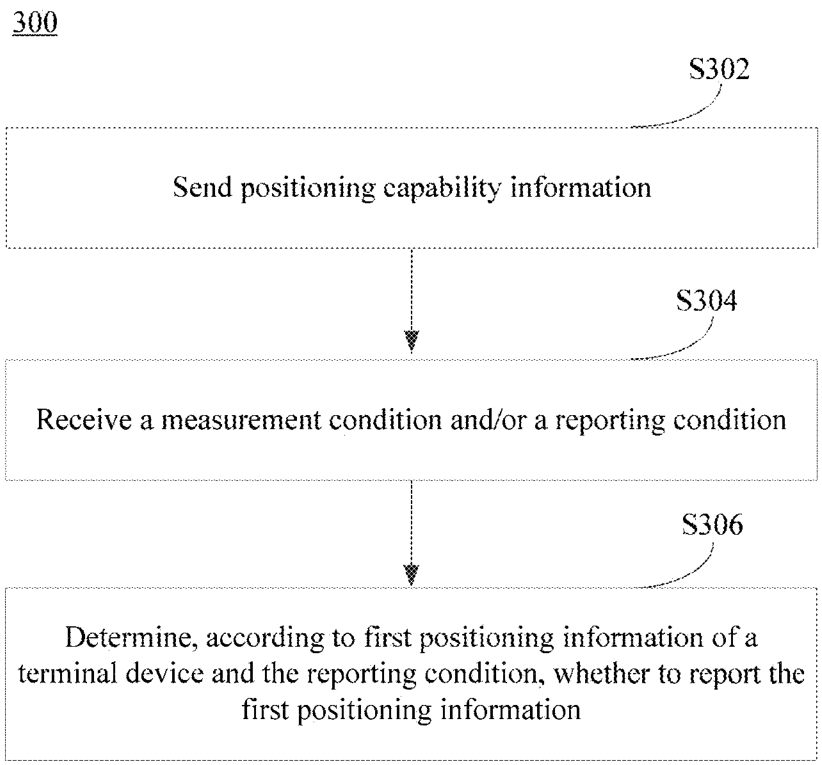
FIG. 3 is a schematic flowchart of a positioning information processing method according to another embodiment of the present disclosure.

As shown in FIG. 3, an embodiment of the present disclosure provides a positioning information processing method 300. The method is performed by a communications device, that is, may be performed by a terminal device and/or a first network device. The first network device may be, for example, a base station, a radio frequency head, or a transmission node. In other words, the method may be performed by software or hardware installed on a terminal device and/or a network device. The method includes the following steps.

S302: Send positioning capability information.

The positioning capability information is sent, where the positioning capability information is used to indicate at least one of the following: whether triggering measurement is supported and/or whether releasing measurement is supported.

Descriptions of this step may be similar to those of step S202 in the embodiment in FIG. 2. Details are not described herein again. S304. Receive a measurement condition and/or a reporting condition.

In an implementation, the UE may support releasing measurement in a predetermined case. For example, when performing intra-frequency or NR inter-frequency or radio access technology cell measurement according to a predetermined measurement rule, the UE may choose to perform releasing measurement.

S304. Receive a measurement condition and/or a reporting condition.

Descriptions of this step may be similar to those of step S204 in the embodiment in FIG. 2. Details are not described herein again.

S306. Determine, according to first positioning information of the terminal device and the measurement condition, whether to measure second positioning information of the terminal device.

Descriptions of this step may be similar to those of step S106 in the embodiment in FIG. 1. For repeated descriptions, details are not described herein again.

In an implementation, the first positioning information of the terminal device includes at least one of location information, velocity information, angular velocity information, relative displacement, a relative velocity, a relative angular velocity, an RSTD measurement value, an RSRP measurement value, an Rx-Tx measurement value, and an angle of arrival measurement value.

In an implementation, the second positioning information of the terminal device may also include at least one of location information, velocity information, angular velocity information, relative displacement, a relative velocity, a relative angular velocity, an RSTD measurement value, an RSRP measurement value, and an Rx-Tx measurement value.

In an implementation, the measurement condition includes a triggering measurement condition and/or a releasing measurement condition. This step may include at least one of the following measurement manners.

Measurement manner 1: Measure the second positioning information in a case that the first positioning information of the terminal device meets the triggering measurement condition.

The triggering measurement condition includes at least one of: being greater than or equal to a third relative displacement threshold, being greater than or equal to a third relative velocity threshold, being greater than or equal to a third relative angular velocity threshold, being greater than or equal to a third angle of arrival threshold, being greater than or equal to a third RSTD threshold, being greater than or equal to a third RSRP threshold, being greater than or equal to a third Rx-Tx threshold, a change in a Wi-Fi node, a change in a Bluetooth node, a change in a receive beam, a change in a strongest energy incoming beam, or a change in a signal.

The case that the first positioning information of the terminal device meets the triggering measurement condition is similar to the foregoing cases 1 to 9 that the first positioning information meets the triggering reporting condition. Details are not described herein again.

Measurement manner 2: Measure the second positioning information in a case that the first positioning information of the terminal device does not meet the releasing measurement condition.

The releasing measurement condition includes at least one of: being less than or equal to a fourth relative displacement threshold, being less than or equal to a fourth relative velocity threshold, being less than or equal to a fourth relative angular velocity threshold, being less than or equal to a fourth angle of arrival threshold, being less than or equal to a fourth RSTD threshold, being less than or equal to a fourth RSRP threshold, being less than or equal to a fourth Rx-Tx threshold, no change in a Wi-Fi node, no change in a Bluetooth node, no change in a receive beam, no change in a strongest energy incoming beam, or no change in a signal.

The case that the first positioning information of the terminal device does not meet the releasing measurement condition is similar to the foregoing cases 1 to 9 that the first positioning information meets the triggering reporting condition. Details are not described herein again.

Alternatively, in a case that the first positioning information of the terminal device meets the releasing measurement condition, for example, displacement is less than the fourth relative displacement threshold, it may be considered that the first positioning information of the terminal device does not need to be re-measured. In this case, the second positioning information is not measured, thereby saving power of the UE. On the contrary, the second positioning information is measured in a case that the first positioning information of the terminal device does not meet the releasing measurement condition, thereby ensuring precision of positioning information of the terminal device.

Measurement manner 3: Measure the second positioning information in a case that the first positioning information of the terminal device meets the releasing measurement condition and a time interval between a current time and a time at which the second positioning information was last measured exceeds a second time threshold.

Alternatively, if the first positioning information of the terminal device meets the releasing measurement condition, but the terminal device has not measured positioning information for a long time (beyond a first time threshold T1), the second positioning information needs to be measured to ensure precision of positioning information of the terminal device.

Measurement manner 4: Measure the second positioning information in a case that the first positioning information of the terminal device is requested to be measured periodically and does not meet the releasing measurement condition.

The second positioning information is measured in a case that the first positioning information of the terminal device is requested to be measured periodically and does not meet the releasing measurement condition. On the contrary, in a case that the first positioning information of the terminal device is requested to be periodically measured, but the first positioning information of the terminal device meets the releasing measurement condition, for example, displacement is less than the fourth relative displacement threshold, the second positioning information may not be measured.

Measurement manner 5: Measure the second positioning information in a case that the first positioning information of the terminal device is requested to be periodically measured and meets the releasing measurement condition, but a time interval between a current time and a time at which the second positioning information was last measured exceeds a second time threshold.

The first time threshold T1 may be a positive integer multiple of a time period t for periodical measurement.

Optionally, in this step and the embodiment in FIG. 2, the first relative displacement threshold, the second relative displacement threshold, the third relative displacement threshold, and the fourth relative displacement threshold may be different; the first relative velocity threshold, the second relative velocity threshold, the third relative velocity threshold, and the fourth relative velocity threshold may be different; the first relative angular velocity threshold, the second relative angular velocity threshold, the third relative angular velocity threshold, and the fourth relative angular velocity threshold may be different; the first RSTD threshold, the second RSTD threshold, the third RSTD threshold, and the fourth RSTD threshold may be different; the first RSRP threshold, the second RSRP threshold, the third RSRP threshold, and the fourth RSRP threshold may be different; and the first Rx-Tx threshold, the second Rx-Tx threshold, the third Rx-Tx threshold, and the fourth Rx-Tx threshold may be different.

In an implementation, the second positioning information includes measurement time information. According to the measurement time information, the second network device may distinguish a measurement condition corresponding to the second positioning information, where the measurement condition corresponding to the second positioning information is a triggering measurement condition, a releasing measurement condition, or periodical measurement. For example, when the measurement time information does not match the time period t for periodical measurement, the measurement condition corresponding to the second positioning information is a triggering measurement condition. When the measurement time information is an integer multiple of the time period t for periodical measurement, the measurement condition corresponding to the second positioning information is measurement in a case that the time interval between the current time and the time at which the second positioning information was last measured exceeds the second time threshold.

Optionally, a value of the foregoing threshold is variable. In addition, it may be indicated, by using a specified parameter, whether releasing measurement at a higher priority frequency is allowed.

In an implementation, there is a correspondence between the second positioning information and the measurement condition.

For example, the second positioning information of the terminal device is location information or relative displacement, a triggering measurement condition corresponding to the location information or the relative displacement may be being greater than or equal to the third relative displacement threshold, and/or a releasing measurement condition corresponding to the location information or the relative displacement may be being less than or equal to the fourth relative displacement threshold. For example, the second positioning information of the terminal device is an RSTD measurement value, a triggering measurement condition corresponding to the RSTD measurement value may be being greater than or equal to the third RSTD threshold, and/or a releasing measurement condition corresponding to the RSTD measurement value may be being less than or equal to the fourth RSTD threshold. Examples are not enumerated herein.

In an implementation, the measurement condition is associated with a positioning manner of the terminal device, where the positioning manner of the terminal device includes at least one of an A-GNSS, an OTDOA, an E-CID, sensor positioning, a WLAN, Bluetooth, a TBS, a DL-TDOA, a DL-AoD, a Multi-RTT, an NR E-CID, an UL-TDOA, and an UL-AoA.

Alternatively, an association manner in which the measurement condition is associated with the positioning manner of the terminal device includes at least one of the following association manners:

Association manner 1: If the measurement condition is being greater than or equal to at least one of a relative displacement threshold, a relative velocity threshold, and a relative angular velocity threshold, the associated positioning manner of the terminal device is at least one of sensor positioning, an A-GNSS, an OTDOA, and a DL-TDOA.

The relative displacement threshold may include the third relative displacement threshold and/or the fourth relative displacement threshold. The relative velocity threshold may include the third relative velocity threshold and/or the fourth relative velocity threshold. The relative angular velocity threshold may include the third relative angular velocity threshold and/or the fourth relative angular velocity threshold.

Association manner 2: If the measurement condition is an RSTD threshold, the associated positioning manner of the terminal device is an OTDOA or a DL TDOA.

The RSTD threshold includes the third RSTD threshold and/or the fourth RSTD threshold.

Association manner 3: If the measurement condition is an RSRP threshold, the associated positioning manner of the terminal device is at least one of an OTDOA, an E-CID, a DL-TDOA, a DL-AoD, a Multi-RTT, an NR E-CID, and an UL-TDOA.

The RSRP threshold includes the third RSRP threshold and/or the fourth RSRP threshold.

Association manner 4: If the measurement condition is an Rx-Tx threshold, the associated positioning manner of the terminal device is a Multi-RTT.

The Rx-Tx threshold includes the third Rx-Tx threshold and/or the fourth Rx-Tx threshold.

Association manner 5: If the measurement condition is a change in a receive beam, a change in a strongest energy incoming beam, or a change in a signal, the associated positioning manner of the terminal device is an AoD.

Association manner 6: If the measurement condition is an angle of arrival threshold, the associated positioning manner of the terminal device is an UL-AoA.

Optionally, threshold values associated with different positioning manners may be the same or different. For example, the third relative displacement threshold associated with the A-GNSS and the fourth relative displacement threshold associated with the OTDOA may be the same or different.

In an implementation, the positioning manner of the terminal device may be indicated by a value of a predetermined bit. For example, if a first bit of predetermined bits is 1, it may indicate that the positioning manner is an A-GNSS; if a second bit of the predetermined bits is 1, it may indicate that the positioning manner is an OTDOA; and if a third bit of the predetermined bits is 1, it may indicate that the positioning manner is an E-CID. Examples are not enumerated herein. In addition, with reference to the foregoing association manners 1 to 6, a corresponding measurement condition may be determined based on the positioning manner indicated by the predetermined bit, and a type of the corresponding second positioning information may be determined based on the measurement condition. For example, the type of the second positioning information is location information or velocity information.

In an implementation, whether the positioning manner of the terminal device supports a corresponding measurement condition may be indicated by a value of a predetermined bit. Alternatively, the value of the predetermined bit may be used to indicate whether the positioning manner of the terminal device supports triggering measurement, and/or whether the positioning manner of the terminal device supports releasing measurement.

For example, if a first bit of predetermined bits is 1, it may indicate that the positioning manner is an A-GNSS supports triggering measurement, and otherwise, if the first bit is 0, it indicates that the positioning manner A-GNSS does not support triggering measurement; if a second bit of the predetermined bits is 1, it may indicate that the positioning manner OTDOA supports triggering measurement, and otherwise, the second bit is 0, it indicates that the positioning manner OTDOA does not support triggering measurement. Examples are not enumerated herein. Specific values of the foregoing bits are only used as an example for description, and are not specifically limited in the protection scope of this solution. In an actual application process, a person skilled in the art may set specifics value of the bits according to an actual requirement without creative efforts. In an implementation, there is a correspondence between the measurement condition and a positioning mode corresponding to a positioning manner of the terminal device, where the positioning mode corresponding to the positioning manner includes at least one of a UE-based mode, a UE-assisted mode, and a standalone mode. For example, if the measurement condition is being greater than or equal to at least one of a relative displacement threshold, a relative velocity threshold, and a relative angular velocity threshold, the positioning manner corresponds to the UE-based mode. For another example, if the measurement condition is an RSTD threshold, the positioning manner corresponds to the UE-assisted mode. Examples are not enumerated herein. Optionally, threshold values associated with different positioning modes may be the same or different.

In an implementation, the positioning mode may be indicated by a value of a predetermined bit. The bit used to indicate the positioning mode is different from the bit used to indicate the positioning manner. For example, if a first bit of predetermined bits is 1, it may indicate that the positioning mode is a standalone mode; if a second bit of the predetermined bits is 1, it may indicate that the positioning mode is a UE-based mode; and if a third bit of the predetermined bits is 1, it may indicate that the positioning mode is a UE-assisted mode. Examples are not enumerated herein. In addition, because there is a correspondence between the positioning mode and the measurement condition, after the positioning mode is determined according to the value of the predetermined bit, the measurement condition may be determined based on the determined positioning mode. Further, a type of the corresponding second positioning information may be determined based on the measurement condition. For example, the type of the second positioning information is location information or velocity information.

In an implementation, whether the positioning mode corresponding to the positioning manner of the terminal device supports a corresponding measurement condition may be indicated by a value of a predetermined bit. Alternatively, the value of the predetermined bit may be used to indicate whether the positioning mode corresponding to the positioning manner of the terminal device supports triggering measurement, and/or whether the positioning mode corresponding to the positioning manner of the terminal device supports releasing measurement. For example, if a first bit of predetermined bits is 1, it may indicate that the positioning mode standalone supports releasing measurement, and on the contrary, if the first bit is 0, it indicates that the positioning mode standalone does not support releasing measurement. Examples are not enumerated herein.

Specific values of the foregoing bits are only used as an example for description, and are not specifically limited in the protection scope of this solution. In an actual application process, a person skilled in the art may perform setting according to an actual requirement without creative efforts.

In an implementation, in a case that the measurement condition is associated with the positioning manner of the terminal device, the positioning capability information sent in step S302 is used to indicate whether the positioning manner of the terminal device supports triggering measurement, and/or whether the positioning manner of the terminal device supports releasing measurement, which may be indicated by the foregoing bit. Details are not repeated herein.

In an implementation, in a case that there is a correspondence between the positioning mode corresponding to the second positioning information and the measurement condition, the positioning capability information sent in step S302 is used to indicate whether the positioning mode supports triggering measurement, and/or whether the positioning mode supports releasing measurement, which may be indicated by the value of the predetermined bit. Details are not repeated herein.

Therefore, according to the positioning information processing method provided in this embodiment of the present disclosure, it is determined, according to first positioning information of a terminal device and a measurement condition, whether to measure second positioning information of the terminal device. In this way, measurement it not performed in a case that there is no need to perform measurement, thereby saving power of user equipment; and measurement is triggered in a case that there is a need to perform measurement, thereby ensuring precision of positioning information.

Figure 4:
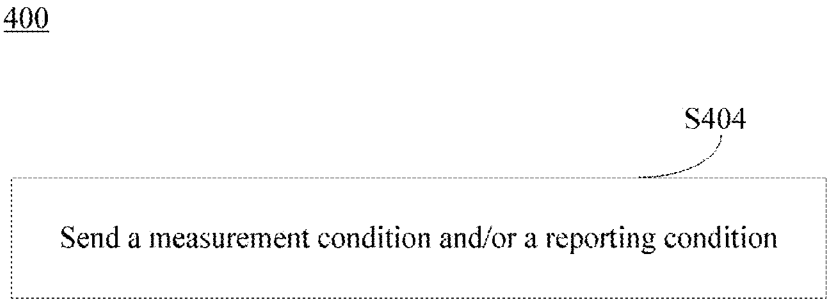
FIG. 4 is a schematic flowchart of a positioning information processing method according to another embodiment of the present disclosure.

With reference to FIG. 4, a positioning information processing method according to another embodiment of the present disclosure is described in detail in the following. It can be understood that interaction between a network device and a terminal device described on the network device side is the same as that described on the terminal device side in the method shown in FIG. 1. To avoid repetition, related descriptions are appropriately omitted.

FIG. 4 is a schematic flowchart of a positioning information processing method according to an embodiment of the present disclosure, which may be applied to a network device side, for example, a second network device LMF. As shown in FIG. 4, a method 400 includes the following steps.

S404. Send a measurement condition and/or a reporting condition.

Therefore, a terminal device determines, according to first positioning information of the terminal device and the reporting condition, whether to report the first positioning information; and/or determines, according to the first positioning information of the terminal device and the measurement condition, whether to measure second positioning information of the terminal device.

Descriptions of this step may be similar to those of step S204 in the embodiment in FIG. 2, and a same or corresponding technical effect is implemented. Interaction between a network device and a terminal device described from a network device side is the same as that described on a terminal device side in the method shown in FIG. 1. To avoid repetition, related descriptions are appropriately omitted.

Figure 5:
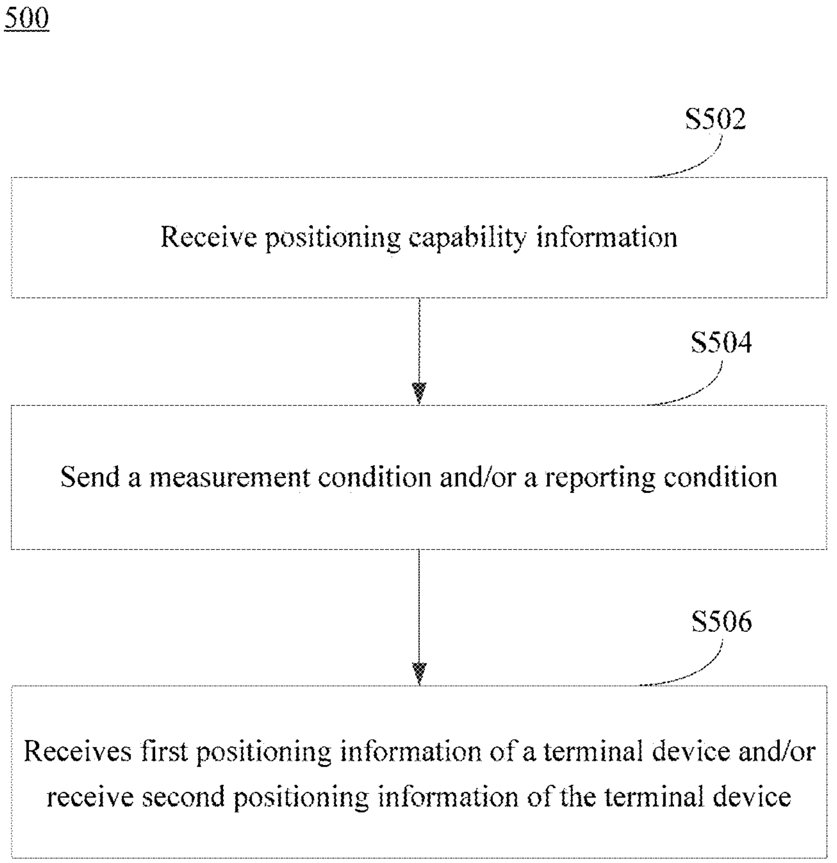
FIG. 5 is a schematic flowchart of a positioning information processing method according to another embodiment of the present disclosure.

FIG. 5 is a schematic flowchart of a positioning information processing method according to an embodiment of the present disclosure, which may be applied to a network device side, for example, a second network device LMF. As shown in FIG. 5, a method 500 includes the following steps.

S502: Receive positioning capability information.

In an implementation, the LMF may send a positioning capability information request, where the positioning capability information is used to indicate at least one of whether triggering reporting is supported, whether releasing reporting is supported, whether triggering measurement is supported, and whether releasing measurement is supported; and/or receive positioning capability information, where the positioning capability information is used to indicate at least one of whether triggering reporting is supported, whether releasing reporting is supported, whether triggering measurement is supported, and whether releasing measurement is supported.

Descriptions of this step may be similar to those of step S202 in the embodiment in FIG. 2. To avoid repetition, related descriptions are appropriately omitted.

S504. Send a measurement condition and/or a reporting condition.

Descriptions of this step may be similar to those of step S404 in the embodiment in FIG. 4. To avoid repetition, related descriptions are appropriately omitted.

S506: Receives first positioning information of the terminal device and/or receive second positioning information of the terminal device.

The first positioning information of the terminal device is reported in a case that the first positioning information meets the triggering reporting condition; and/or is reported in a case that the first positioning information does not meet the releasing reporting condition; and/or is reported in a case that the first positioning information of the terminal device is requested to be reported periodically and does not meet the releasing reporting condition; and/or is reported in a case that the first positioning information of the terminal device meets the releasing reporting condition and a time interval between a current time and a time at which the first positioning information was last reported exceeds a first time threshold.

The second positioning information of the terminal device is measured in a case that the first positioning information of the terminal device meets the triggering measurement condition; and/or is measured in a case that the first positioning information of the terminal device does not meet the releasing measurement condition; and/or is measured in a case that the first positioning information of the terminal device is requested to be measured periodically and does not meet the releasing measurement condition; and/or is measured in a case that the first positioning information of the terminal device meets the releasing measurement condition and a time interval between a current time and a time at which the second positioning information was last measured exceeds a second time threshold.

Descriptions of this step may be similar to those of step S204 in the embodiment in FIG. 2 and/or step S304 in the embodiment in FIG. 3. To avoid repetition, related descriptions are appropriately omitted.

The first positioning information and/or the second positioning information of the terminal device include/includes at least one of location information, velocity information, angular velocity information, relative displacement, a relative velocity, a relative angular velocity, an RSTD measurement value, an RSRP measurement value, an Rx-Tx measurement value, and an angle of arrival measurement value.

In an implementation, the triggering reporting condition includes at least one of: being greater than or equal to a first relative displacement threshold, being greater than or equal to a first relative velocity threshold, being greater than or equal to a first angle of arrival threshold, being greater than or equal to a first relative angular velocity threshold, being greater than or equal to a first RSTD threshold, being greater than or equal to a first RSRP threshold, being greater than or equal to a first Rx-Tx threshold, a change in a Wi-Fi node, a change in a Bluetooth node, a change in a receive beam, a change in a strongest energy incoming beam, or a change in a signal.

In an implementation, the releasing reporting condition includes at least one of: being less than or equal to a second relative displacement threshold, being less than or equal to a second relative velocity threshold, being less than or equal to a second angle of arrival threshold, being less than or equal to a second relative angular velocity threshold, being less than or equal to a second RSTD threshold, being less than or equal to a second RSRP threshold, being less than or equal to a second Rx-Tx threshold, no change in a Wi-Fi node, no change in a Bluetooth node, no change in a receive beam, no change in a strongest energy incoming beam, or no change in a signal.

In an implementation, the triggering measurement condition includes at least one of: being greater than or equal to a third relative displacement threshold, being greater than or equal to a third relative velocity threshold, being greater than or equal to a third relative angular velocity threshold, being greater than or equal to a third angle of arrival threshold, being greater than or equal to a third RSTD threshold, being greater than or equal to a third RSRP threshold, being greater than or equal to a third Rx-Tx threshold, a change in a Wi-Fi node, a change in a Bluetooth node, a change in a receive beam, a change in a strongest energy incoming beam, or a change in a signal.

In an implementation, the releasing measurement condition includes at least one of: being less than or equal to a fourth relative displacement threshold, being less than or equal to a fourth relative velocity threshold, being less than or equal to a fourth relative angular velocity threshold, being less than or equal to a fourth angle of arrival threshold, being less than or equal to a fourth RSTD threshold, being less than or equal to a fourth RSRP threshold, being less than or equal to a fourth Rx-Tx threshold, no change in a Wi-Fi node, no change in a Bluetooth node, no change in a receive beam, no change in a strongest energy incoming beam, or no change in a signal.

In an implementation, the first relative displacement threshold, the second relative displacement threshold, the third relative displacement threshold, and the fourth relative displacement threshold are different; and/or the first relative velocity threshold, the second relative velocity threshold, the third relative velocity threshold, and the fourth relative velocity threshold are different; and/or the first relative angular velocity threshold, the second relative angular velocity threshold, the third relative angular velocity threshold, and the fourth relative angular velocity threshold are different; and/or the first RSTD threshold, the second RSTD threshold, the third RSTD threshold, and the fourth RSTD threshold are different; and/or the first RSRP threshold, the second RSRP threshold, the third RSRP threshold, and the fourth RSRP threshold are different; and/or the first Rx-Tx threshold, the second Rx-Tx threshold, the third Rx-Tx threshold, and the fourth Rx-Tx threshold are different.

In an implementation, the first positioning information and/or the second positioning information include/includes reporting and/or measurement time information; and the method further includes: distinguishing, according to the time information, a reporting condition corresponding to the first positioning information and/or a measurement condition corresponding to the second positioning information.

In an implementation, there is a correspondence between the first positioning information and/or the second positioning information and the measurement condition and/or the reporting condition.

In an implementation, the measurement condition and/or the reporting condition are/is associated with a positioning manner of the terminal device, where the positioning manner of the terminal device includes at least one of an A-GNSS, an OTDOA, an E-CID, sensor positioning, a WLAN, Bluetooth, a TBS, a DL-TDOA, a DL-AoD, a Multi-RTT, an NR E-CID, an UL-TDOA, and an UL-AoA.

In an implementation, that the measurement condition and/or the reporting condition are/is associated with a positioning manner of the terminal device includes at least one of the following association manners: when the measurement condition and/or the reporting condition are/is being greater than or equal to at least one of a relative displacement threshold, a relative velocity threshold, and a relative angular velocity threshold, the associated positioning manner of the terminal device is at least one of sensor positioning, an A-GNSS, an OTDOA, and a DL-TDOA; when the measurement condition and/or the reporting condition are/is being greater than or equal to an RSTD threshold, the associated positioning manner of the terminal device is an OTDOA or a DL TDOA; when the measurement condition and/or the reporting condition are/is being greater than or equal to an RSRP threshold, the associated positioning manner of the terminal device is at least one of an OTDOA, an E-CID, a DL-TDOA, a DL-AoD, a Multi-RTT, an NR E-CID, and an UL-TDOA; when the measurement condition and/or the reporting condition are/is being greater than or equal to an Rx-Tx threshold, the associated positioning manner of the terminal device is a Multi-RTT; when the measurement condition and/or the reporting condition are/is a change in a receive beam, a change in a strongest energy incoming beam, or a change in a signal, the associated positioning manner of the terminal device is an AoD; and when the measurement condition and/or the reporting condition are/is being greater than or equal to an angle of arrival threshold, the associated positioning manner of the terminal device is an UL-AoA.

In an implementation, there is a correspondence between the measurement condition and/or the reporting condition and a positioning mode corresponding to a positioning manner of the terminal device, where the positioning mode corresponding to the positioning manner of the terminal device includes at least one of a UE-based mode, a UE-assisted mode, and a standalone mode.

In an implementation, in a case that the measurement condition and/or the reporting condition are/is associated with a positioning manner of the terminal device, the positioning capability information is used to indicate at least one of the following content: whether the positioning manner of the terminal device supports triggering reporting, whether the positioning manner of the terminal device supports releasing reporting, whether the positioning manner of the terminal device supports triggering measurement, and whether the positioning manner of the terminal device supports releasing measurement.

In an implementation, in a case that there is a correspondence between the measurement condition and/or the reporting condition and a positioning mode corresponding to a positioning manner of the terminal device, the positioning capability information is used to indicate at least one of the following content: whether the positioning mode supports triggering reporting, whether the positioning mode supports releasing reporting, whether the positioning mode supports triggering measurement, and whether the positioning mode supports releasing measurement.

In an implementation, at least one of the following content is indicated by using a value of a predetermined bit: whether a positioning manner of the terminal device supports triggering reporting; whether the positioning manner of the terminal device supports releasing reporting; whether the positioning manner of the terminal device supports triggering measurement; whether the positioning manner of the terminal device supports releasing measurement; whether a positioning mode corresponding to the positioning manner of the terminal device supports triggering reporting; whether the positioning mode corresponding to the positioning manner of the terminal device supports releasing reporting; whether the positioning mode corresponding to the positioning manner of the terminal device supports triggering measurement; and whether the positioning mode corresponding to the positioning manner of the terminal device supports releasing measurement, where the positioning manner of the terminal device includes at least one of an A-GNSS, an OTDOA, an E-CID, sensor positioning, a WLAN, Bluetooth, a TBS, a DL-TDOA, a DL-AoD, a Multi-RTT, an NR E-CID, an UL-TDOA, and an UL-AoA, and the positioning mode corresponding to the positioning manner of the terminal device includes at least one of a user equipment-based (UE-based) mode, a user equipment-assisted (UE-assisted) mode, and a standalone (standalone) mode.

A terminal device in the embodiments of the present disclosure is described in detail below with reference to FIG. 6.

Figure 6:
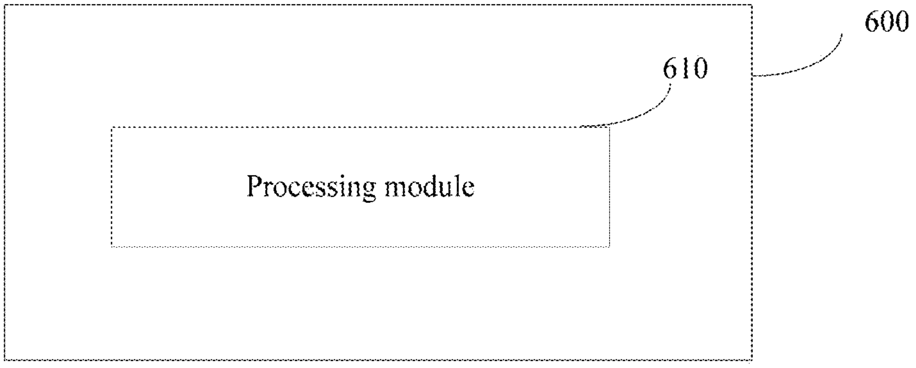
FIG. 6 is a schematic structural diagram of a communications device according to an embodiment of the present disclosure.

FIG. 6 is a schematic structural diagram of a communications device according to an embodiment of the present disclosure. A communications device 600 may be a terminal device or a base station, a radio frequency head, a transmission node, or the like. As shown in FIG. 6, the communications device 600 includes a processing module 610.

The processing module 610 is configured to determine, according to first positioning information of a terminal device, whether to measure second positioning information of the terminal device and/or whether to report the first positioning information.

In an implementation, before determining whether to measure the second positioning information of the terminal device and/or whether to report the first positioning information, the processing module 610 is configured to receive a measurement condition and/or a reporting condition.

In an implementation, the measurement condition and/or the reporting condition are/is included in location request information.

In an implementation, the processing module 610 is configured to determine, according to the first positioning information of the terminal device and the reporting condition, whether to report the first positioning information; and/or determine, according to the first positioning information of the terminal device and the measurement condition, whether to measure the second positioning information of the terminal device.

In an implementation, the reporting condition includes a triggering reporting condition and/or a releasing reporting condition, and the processing module 610 is configured to: report the first positioning information in a case that the first positioning information of the terminal device meets the triggering reporting condition; or report the first positioning information in a case that the first positioning information of the terminal device does not meet the releasing reporting condition; or report the first positioning information in a case that the first positioning information of the terminal device meets the releasing reporting condition and a time interval between a current time and a time at which the first positioning information was last reported exceeds a first time threshold.

In an implementation, the processing module 610 is configured to report the first positioning information in a case that the first positioning information of the terminal device is requested to be reported periodically and does not meet the releasing reporting condition.

In an implementation, the measurement condition includes a triggering measurement condition and/or a releasing measurement condition, and the processing module 610 is configured to: measure the second positioning information in a case that the first positioning information of the terminal device meets the triggering measurement condition; or measure the second positioning information in a case that the first positioning information of the terminal device does not meet the releasing measurement condition; or measure the second positioning information in a case that the first positioning information of the terminal device meets the releasing measurement condition and a time interval between a current time and a time at which the second positioning information was last measured exceeds a second time threshold.

In an implementation, the processing module 610 is configured to measure the second positioning information in a case that the first positioning information of the terminal device is requested to be measured periodically and does not meet the releasing measurement condition.

In an implementation, the first positioning information and/or the second positioning information of the terminal device include/includes at least one of location information, velocity information, angular velocity information, relative displacement, a relative velocity, a relative angular velocity, an RSTD measurement value, an RSRP measurement value, an Rx-Tx measurement value, and an angle of arrival measurement value.

In an implementation, the triggering reporting condition includes at least one of: being greater than or equal to a first relative displacement threshold, being greater than or equal to a first relative velocity threshold, being greater than or equal to a first relative angular velocity threshold, being greater than or equal to a first angle of arrival threshold, being greater than or equal to a first RSTD threshold, being greater than or equal to a first RSRP threshold, being greater than or equal to a first Rx-Tx threshold, a change in a Wi-Fi node, a change in a Bluetooth node, a change in a receive beam, a change in a strongest energy incoming beam, or a change in a signal.

In an implementation, the releasing reporting condition includes at least one of: being less than or equal to a second relative displacement threshold, being less than or equal to a second relative velocity threshold, being less than or equal to a second relative angular velocity threshold, being less than or equal to a second angle of arrival threshold, being less than or equal to a second RSTD threshold, being less than or equal to a second RSRP threshold, being less than or equal to a second Rx-Tx threshold, no change in a Wi-Fi node, no change in a Bluetooth node, no change in a receive beam, no change in a strongest energy incoming beam, or no change in a signal.

In an implementation, the triggering measurement condition includes at least one of: being greater than or equal to a third relative displacement threshold, being greater than or equal to a third relative velocity threshold, being greater than or equal to a third relative angular velocity threshold, being greater than or equal to a third angle of arrival threshold, being greater than or equal to a third RSTD threshold, being greater than or equal to a third RSRP threshold, being greater than or equal to a third Rx-Tx threshold, a change in a Wi-Fi node, a change in a Bluetooth node, a change in a receive beam, a change in a strongest energy incoming beam, or a change in a signal.

In an implementation, the releasing measurement condition includes at least one of: being less than or equal to a fourth relative displacement threshold, being less than or equal to a fourth relative velocity threshold, being less than or equal to a fourth relative angular velocity threshold, being less than or equal to a fourth angle of arrival threshold, being less than or equal to a fourth RSTD threshold, being less than or equal to a fourth RSRP threshold, being less than or equal to a fourth Rx-Tx threshold, no change in a Wi-Fi node, no change in a Bluetooth node, no change in a receive beam, no change in a strongest energy incoming beam, or no change in a signal.

In an implementation, the first relative displacement threshold, the second relative displacement threshold, the third relative displacement threshold, and the fourth relative displacement threshold are different; and/or the first relative velocity threshold, the second relative velocity threshold, the third relative velocity threshold, and the fourth relative velocity threshold are different; and/or the first relative angular velocity threshold, the second relative angular velocity threshold, the third relative angular velocity threshold, and the fourth relative angular velocity threshold are different; and/or the first RSTD threshold, the second RSTD threshold, the third RSTD threshold, and the fourth RSTD threshold are different; and/or the first RSRP threshold, the second RSRP threshold, the third RSRP threshold, and the fourth RSRP threshold are different; and/or the first Rx-Tx threshold, the second Rx-Tx threshold, the third Rx-Tx threshold, and the fourth Rx-Tx threshold are different.

In an implementation, the first positioning information and/or the second positioning information include/includes reporting and/or measurement time information.

In an implementation, there is a correspondence between the first positioning information and/or the second positioning information and the measurement condition and/or the reporting condition.

In an implementation, there is a correspondence between the measurement condition and/or the reporting condition and a positioning mode corresponding to a positioning manner of the terminal device, where the positioning mode corresponding to the positioning manner of the terminal device includes at least one of a user equipment-based (UE-based) mode, a user equipment-assisted (UE-assisted) mode, and a standalone (standalone) mode.

In an implementation, the measurement condition and/or the reporting condition are/is associated with a positioning manner of the terminal device, where the positioning manner of the terminal device includes at least one of an A-GNSS, an OTDOA, an E-CID, sensor positioning, a WLAN, Bluetooth, a TBS, a DL-TDOA, a DL-AoD, a Multi-RTT, an NR E-CID, an UL-TDOA, and an UL-AoA.

In an implementation, that the measurement condition and/or the reporting condition are/is associated with a positioning manner of the terminal device includes at least one of the following association manners: when the measurement condition and/or the reporting condition are/is being greater than or equal to at least one of a relative displacement threshold, a relative velocity threshold, and a relative angular velocity threshold, the associated positioning manner of the terminal device is at least one of sensor positioning, an A-GNSS, an OTDOA, and a DL-TDOA; when the measurement condition and/or the reporting condition are/is being greater than or equal to an RSTD threshold, the associated positioning manner of the terminal device is an OTDOA or a DL TDOA; when the measurement condition and/or the reporting condition are/is being greater than equal to an RSRP threshold, the associated positioning manner of the terminal device is at least one of an OTDOA, an E-CID, a DL-TDOA, a DL-AoD, a Multi-RTT, an NR E-CID, and an UL-TDOA; when the measurement condition and/or the reporting condition are/is being greater than or equal to an Rx-Tx threshold, the associated positioning manner of the terminal device is a Multi-RTT; when the measurement condition and/or the reporting condition are/is a change in a receive beam, a change in a strongest energy incoming beam, or a change in a signal, the associated positioning manner of the terminal device is an AoD; and when the measurement condition and/or the reporting condition are/is being greater than or equal to an angle of arrival threshold, the associated positioning manner of the terminal device is an UL-AoA.

In an implementation, before the receiving the measurement condition and/or the reporting condition, the processing module 610 is configured to send positioning capability information, where the positioning capability information is used to indicate at least one of the following content: whether triggering reporting is supported, whether releasing reporting is supported, whether triggering measurement is supported, and whether releasing measurement is supported.

In an implementation, in a case that the measurement condition and/or the reporting condition are/is associated with a positioning manner of the terminal device, the positioning capability information is used to indicate at least one of the following content: whether the positioning manner of the terminal device supports triggering reporting, whether the positioning manner of the terminal device supports releasing reporting, whether the positioning manner of the terminal device supports triggering measurement, and whether the positioning manner of the terminal device supports releasing measurement.

In an implementation, in a case that there is a correspondence between the measurement condition and/or the reporting condition and a positioning mode corresponding to a positioning manner of the terminal device, the positioning capability information is used to indicate at least one of the following content: whether the positioning mode supports triggering reporting, whether the positioning mode supports releasing reporting, whether the positioning mode supports triggering measurement, and whether the positioning mode supports releasing measurement.

In an implementation, at least one of the following content is indicated by using a value of a predetermined bit: whether a positioning manner of the terminal device supports triggering reporting; whether the positioning manner of the terminal device supports releasing reporting; whether the positioning manner of the terminal device supports triggering measurement; whether the positioning manner of the terminal device supports releasing measurement; whether a positioning mode corresponding to the positioning manner of the terminal device supports triggering reporting; whether the positioning mode corresponding to the positioning manner of the terminal device supports releasing reporting; whether the positioning mode corresponding to the positioning manner of the terminal device supports triggering measurement; and whether the positioning mode corresponding to the positioning manner of the terminal device supports releasing measurement, where the positioning manner of the terminal device includes at least one of an A-GNSS, an OTDOA, an E-CID, sensor positioning, a WLAN, Bluetooth, a TBS, a DL-TDOA, a DL-AoD, a Multi-RTT, an NR E-CID, an UL-TDOA, and an UL-AoA, and the positioning mode corresponding to the positioning manner of the terminal device includes at least one of a user equipment-based (UE-based) mode, a user equipment-assisted (UE-assisted) mode, and a standalone (standalone) mode.

The terminal device 600 according to the embodiments of the present disclosure may correspond to the procedures of the methods 100 to 300 in the embodiments of the present disclosure, and the units/modules in the terminal device 600 and the foregoing operations and/or functions are respectively for implementing the corresponding procedures of the methods 100 to 300 and a same or similar technical effect can be achieved. For brevity, details are not described herein again.

Figure 7:
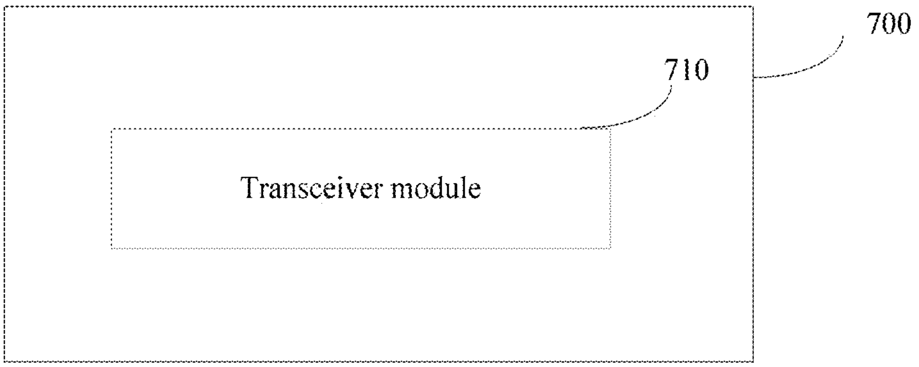
FIG. 7 is a schematic structural diagram of a network device according to an embodiment of the present disclosure.

FIG. 7 is a schematic structural diagram of a network device according to an embodiment of the present disclosure. The network device is, for example, an LMF. As shown in FIG. 7, a network device 700 includes a transceiver module 710.

The transceiver module 710 is configured to send a measurement condition and/or a reporting condition.

In an implementation, the measurement condition and/or the reporting condition are/is included in location request information.

In an implementation, the reporting condition includes a triggering reporting condition and/or a releasing reporting condition, and the transceiver module 710 is configured to receive first positioning information of a terminal device, where the first positioning information of the terminal device is reported in a case that the first positioning information meets the triggering reporting condition; and/or is reported in a case that the first positioning information does not meet the releasing reporting condition; and/or is reported in a case that the first positioning information of the terminal device is requested to be reported periodically and does not meet the releasing reporting condition; and/or is reported in a case that the first positioning information of the terminal device meets the releasing reporting condition and a time interval between a current time and a time at which the first positioning information was last reported exceeds a first time threshold.

In an implementation, the measurement condition includes a triggering measurement condition and/or a releasing measurement condition, and the transceiver module 710 is configured to receive second positioning information of a terminal device, where the second positioning information of the terminal device is measured in a case that the first positioning information of the terminal device meets the triggering measurement condition; and/or is measured in a case that the first positioning information of the terminal device does not meet the releasing measurement condition; and/or is measured in a case that the first positioning information of the terminal device is requested to be measured periodically and does not meet the releasing measurement condition; and/or is measured in a case that the first positioning information of the terminal device meets the releasing measurement condition and a time interval between a current time and a time at which the second positioning information was last measured exceeds a second time threshold.

In an implementation, the first positioning information and/or the second positioning information of the terminal device include/includes at least one of location information, velocity information, angular velocity information, relative displacement, a relative velocity, a relative angular velocity, an RSTD measurement value, an RSRP measurement value, an Rx-Tx measurement value, and an angle of arrival measurement value.

In an implementation, the triggering reporting condition includes at least one of: being greater than or equal to a first relative displacement threshold, being greater than or equal to a first relative velocity threshold, being greater than or equal to a first relative angular velocity threshold, being greater than or equal to a first angle of arrival threshold, being greater than or equal to a first RSTD threshold, being greater than or equal to a first RSRP threshold, being greater than or equal to a first Rx-Tx threshold, a change in a Wi-Fi node, a change in a Bluetooth node, a change in a receive beam, a change in a strongest energy incoming beam, or a change in a signal.

In an implementation, the releasing reporting condition includes at least one of: being less than or equal to a second relative displacement threshold, being less than or equal to a second relative velocity threshold, being less than or equal to a second relative angular velocity threshold, being less than or equal to a second angle of arrival threshold, being less than or equal to a second RSTD threshold, being less than or equal to a second RSRP threshold, being less than or equal to a second Rx-Tx threshold, no change in a Wi-Fi node, no change in a Bluetooth node, no change in a receive beam, no change in a strongest energy incoming beam, or no change in a signal.

In an implementation, the triggering measurement condition includes at least one of: being greater than or equal to a third relative displacement threshold, being greater than or equal to a third relative velocity threshold, being greater than or equal to a third relative angular velocity threshold, being greater than or equal to a third angle of arrival threshold, being greater than or equal to a third RSTD threshold, being greater than or equal to a third RSRP threshold, being greater than or equal to a third Rx-Tx threshold, a change in a Wi-Fi node, a change in a Bluetooth node, a change in a receive beam, a change in a strongest energy incoming beam, or a change in a signal.

In an implementation, the releasing measurement condition includes at least one of: being less than or equal to a fourth relative displacement threshold, being less than or equal to a fourth relative velocity threshold, being less than or equal to a fourth relative angular velocity threshold, being less than or equal to a fourth angle of arrival threshold, being less than or equal to a fourth RSTD threshold, being less than or equal to a fourth RSRP threshold, being less than or equal to a fourth Rx-Tx threshold, no change in a Wi-Fi node, no change in a Bluetooth node, no change in a receive beam, no change in a strongest energy incoming beam, or no change in a signal.

In an implementation, the first relative displacement threshold, the second relative displacement threshold, the third relative displacement threshold, and the fourth relative displacement threshold are different; and/or the first relative velocity threshold, the second relative velocity threshold, the third relative velocity threshold, and the fourth relative velocity threshold are different; and/or the first relative angular velocity threshold, the second relative angular velocity threshold, the third relative angular velocity threshold, and the fourth relative angular velocity threshold are different; and/or the first RSTD threshold, the second RSTD threshold, the third RSTD threshold, and the fourth RSTD threshold are different; and/or the first RSRP threshold, the second RSRP threshold, the third RSRP threshold, and the fourth RSRP threshold are different; and/or the first Rx-Tx threshold, the second Rx-Tx threshold, the third Rx-Tx threshold, and the fourth Rx-Tx threshold are different.

In an implementation, the first positioning information and/or the second positioning information include/includes reporting and/or measurement time information; and the transceiver module 710 is configured to distinguish, according to the time information, a reporting condition corresponding to the first positioning information and/or a measurement condition corresponding to the second positioning information.

In an implementation, there is a correspondence between the first positioning information and/or the second positioning information and the measurement condition and/or the reporting condition.

In an implementation, the measurement condition and/or the reporting condition are/is associated with a positioning manner of the terminal device, where the positioning manner of the terminal device includes at least one of an A-GNSS, an OTDOA, an E-CID, sensor positioning, a WLAN, Bluetooth, a TBS, a DL-TDOA, a DL-AoD, a Multi-RTT, an NR E-CID, an UL-TDOA, and an UL-AoA.

In an implementation, that the measurement condition and/or the reporting condition are/is associated with a positioning manner of the terminal device includes at least one of the following association manners: when the measurement condition and/or the reporting condition are/is being greater than or equal to at least one of a relative displacement threshold, a relative velocity threshold, and a relative angular velocity threshold, the associated positioning manner of the terminal device is at least one of sensor positioning, an A-GNSS, an OTDOA, and a DL-TDOA; when the measurement condition and/or the reporting condition are/is being greater than or equal to an RSTD threshold, the associated positioning manner of the terminal device is an OTDOA or a DL TDOA; when the measurement condition and/or the reporting condition are/is being greater than or equal to an RSRP threshold, the associated positioning manner of the terminal device is at least one of an OTDOA, an E-CID, a DL-TDOA, a DL-AoD, a Multi-RTT, an NR E-CID, and an UL-TDOA; when the measurement condition and/or the reporting condition are/is being greater than or equal to an Rx-Tx threshold, the associated positioning manner of the terminal device is a Multi-RTT; when the measurement condition and/or the reporting condition are/is a change in a receive beam, a change in a strongest energy incoming beam, or a change in a signal, the associated positioning manner of the terminal device is an AoD; and when the measurement condition and/or the reporting condition are/is being greater than or equal to an angle of arrival threshold, the associated positioning manner of the terminal device is an UL-AoA.

In an implementation, there is a correspondence between the measurement condition and/or the reporting condition and a positioning mode corresponding to a positioning manner of the terminal device, where the positioning mode corresponding to the positioning manner of the terminal device includes at least one of a user equipment-based (UE-based) mode, a user equipment-assisted (UE-assisted) mode, and a standalone (standalone) mode.

In an implementation, before sending the measurement condition and/or the reporting condition the transceiver module 710 is configured to: send a positioning capability information request, where the positioning capability information is used to indicate at least one of the following content: whether triggering reporting is supported, whether releasing reporting is supported, whether triggering measurement is supported, and whether releasing measurement is supported; and/or receive positioning capability information, where the positioning capability information is used to indicate at least one of the following: whether triggering reporting is supported, whether releasing reporting is supported, whether triggering measurement is supported, and whether releasing measurement is supported.

In an implementation, in a case that the measurement condition and/or the reporting condition are/is associated with a positioning manner of the terminal device, the positioning capability information is used to indicate at least one of the following content: whether the positioning manner of the terminal device supports triggering reporting, whether the positioning manner of the terminal device supports releasing reporting, whether the positioning manner of the terminal device supports triggering measurement, and whether the positioning manner of the terminal device supports releasing measurement.

In an implementation, in a case that there is a correspondence between the measurement condition and/or the reporting condition and a positioning mode corresponding to a positioning manner of the terminal device, the positioning capability information is used to indicate at least one of the following content: whether the positioning mode supports triggering reporting, whether the positioning mode supports releasing reporting, whether the positioning mode supports triggering measurement, and whether the positioning mode supports releasing measurement.

In an implementation, at least one of the following content is indicated by using a value of a predetermined bit: whether a positioning manner of the terminal device supports triggering reporting; whether the positioning manner of the terminal device supports releasing reporting; whether the positioning manner of the terminal device supports triggering measurement; whether the positioning manner of the terminal device supports releasing measurement; whether a positioning mode corresponding to the positioning manner of the terminal device supports triggering reporting; whether the positioning mode corresponding to the positioning manner of the terminal device supports releasing reporting; whether the positioning mode corresponding to the positioning manner of the terminal device supports triggering measurement; and whether the positioning mode corresponding to the positioning manner of the terminal device supports releasing measurement, where the positioning manner of the terminal device includes at least one of an A-GNSS, an OTDOA, an E-CID, sensor positioning, a WLAN, Bluetooth, a TBS, a DL-TDOA, a DL-AoD, a Multi-RTT, an NR E-CID, an UL-TDOA, and an UL-AoA, and the positioning mode corresponding to the positioning manner of the terminal device includes at least one of a user equipment-based (UE-based) mode, a user equipment-assisted (UE-assisted) mode, and a standalone (standalone) mode.

The network device 700 according to the embodiments of the present disclosure may correspond to the procedures of the methods 400 and 500 in the embodiments of the present disclosure, and the units/modules in the network device 700 and the foregoing operations and/or functions are respectively for implementing the corresponding procedures of the methods 400 and 500 and a same or similar technical effect can be achieved. For brevity, details are not described herein again.

Figure 8:
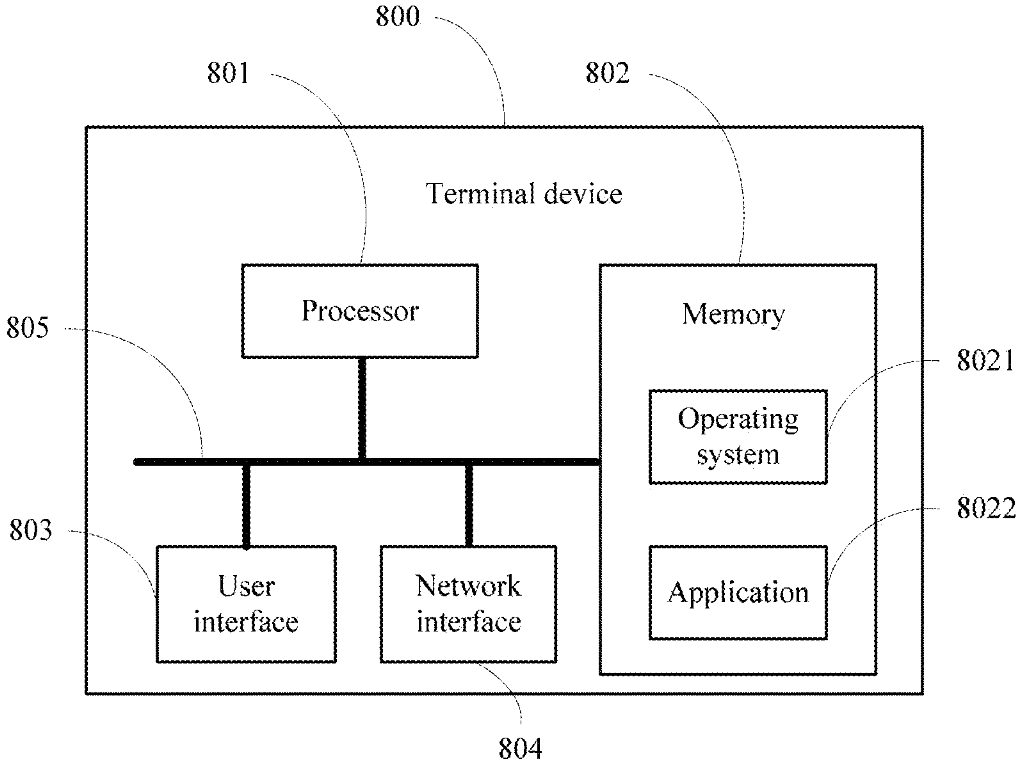
FIG. 8 is a schematic structural diagram of a terminal device according to another embodiment of the present disclosure.

FIG. 8 is a block diagram of a terminal device according to another embodiment of the present disclosure. A terminal device 800 shown in FIG. 8 includes at least one processor 801, a memory 802, at least one network interface 804, and a user interface 803. All components of the terminal device 800 are coupled together by using the bus system 805. It can be understood that the bus system 805 is configured to implement a connection and communication between these components. In addition to a data bus, the bus system 805 may include a power bus, a control bus, and a status signal bus. However, for clear description, various types of buses in FIG. 8 are marked as the bus system 805.

The user interface 803 may include a display, a keyboard, a clicking device (for example, a mouse, a trackball (trackball)), a touch panel, or a touchscreen.

It can be understood that the memory 802 in this embodiment of the present disclosure may be a volatile memory or a non-volatile memory, or may include both a volatile memory and a non-volatile memory. The nonvolatile memory may be a read-only memory (ROM), a programmable read-only memory (PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), used as an external cache. Through example but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DRRAM). The memory 802 in the system and the method that are described in the embodiments of the present disclosure is to include but is not limited to these memories and a memory of any other proper type.

In some implementation manners, the memory 802 stores the following element, an executable module or a data structure, or a subset thereof, or an extension set thereof: an operating system 8021 and an application 8022.

The operating system 8021 includes various system programs, for example, a framework layer, a kernel library layer, and a driver layer, and is configured to implement various basic services and process hardware-based tasks. The application 8022 includes various applications, for example, a media player (Media Player), and a browser (Browser), to implement various application services. A program for implementing the method in the embodiments of the present disclosure may be included in the application 8022.

In this embodiment of the present disclosure, the terminal device 800 further includes a computer program that is stored in the memory 802 and that can be run on the processor 801, and when the computer program is executed by the processor 801, the steps of the method 100 are implemented:

The method disclosed in the foregoing embodiment of the present disclosure may be applied to the processor 801, or implemented by the processor 801. The processor 801 may be an integrated circuit chip and has a signal processing capability. During implementation, each step of the foregoing method may be completed by using an integrated logic circuit of hardware in the processor 801 or an instruction in a form of software. The processor 801 may be a general purpose processor, a digital signal processor (DSP), an application specific integrated circuit (ASIC), a field programmable gate array (FPGA) or another programmable logic device, a discrete gate or transistor logic device, or a discrete hardware component. The processor may implement or perform the methods, the steps, and logical block diagrams that are disclosed in the embodiments of the present disclosure. The general-purpose processor may be a microprocessor, or the processor may be any conventional processor or the like. Steps of the methods disclosed with reference to the embodiments of the present disclosure may be directly executed and accomplished through a hardware decoding processor, or may be executed and accomplished by using a combination of hardware and software modules in the decoding processor. A software module may be located in a mature computer-readable storage medium in the art, such as a random access memory, a flash memory, a read-only memory, a programmable read-only memory, an electrically erasable programmable memory, a register, or the like. The computer-readable storage medium is located in the memory 802, and the processor 801 reads information in the memory 802 and completes the steps in the foregoing method in combination with hardware of the processor 801. Alternatively, the computer-readable storage medium stores a computer program, and when the computer program is executed by the processor 801, the steps of the embodiments of the foregoing method 100 to 300 are implemented.

It can be understood that the embodiments described in the embodiments of the present disclosure may be implemented by hardware, software, firmware, middleware, microcode, or a combination thereof. For hardware implementation, a processing unit may be implemented in one or more application specific integrated circuits (ASIC), digital signal processors (DSP), digital signal processing devices (DSP Device, DSPD), programmable logic devices (PLD), field-programmable gate arrays (FPGA), general purpose processors, controllers, microcontrollers, microprocessors, or other electronic units or a combination thereof used to perform the functions in this application.

For software implementation, the technology in the embodiments of the present disclosure may be implemented through modules (for example, procedures or functions) that perform the functions in the embodiments of the present disclosure. Software code may be stored in a memory and executed by a processor. The memory may be implemented in the processor or outside the processor.

The terminal device 800 can implement the processes implemented by the terminal device in the foregoing embodiments 100 to 300 and a same or similar technical effect can be achieved. To avoid repetition, details are not described herein again.

Figure 9:
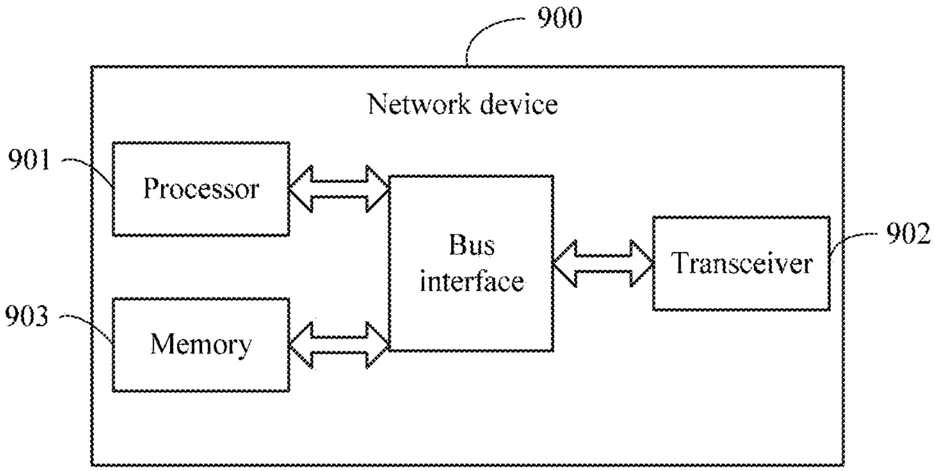
FIG. 9 is a schematic structural diagram of a network device according to another embodiment of the present disclosure.

Referring to FIG. 9, FIG. 9 is a structural diagram of a network device according to an embodiment of the present disclosure. The network device may be a base station or an LMF. When a network device 900 is a base station, details of the method embodiments 100 to 300 can be implemented. When the network device 900 is an LMF, details of the method embodiments 400 and 500 can be implemented, and a same effect can be achieved. As shown in FIG. 9, the network device 900 includes a processor 901, a transceiver 902, a memory 903, and a bus interface.

In this embodiment of the present disclosure, the network device 900 further includes a computer program that is stored in the memory 903 and that can be run on the processor 901. When the network device 900 is a base station and the computer program is executed by the processor 901, the steps of the method embodiments 100 to 300 are implemented. When the network device 900 is an LMF and the computer program is executed by the processor 901, the steps of the method 400 and 500 are implemented.

In FIG. 9, a bus architecture may include any quantity of interconnected buses and bridges. Alternatively, various circuits of one or more processors represented by the processor 901 and a memory represented by the memory 903 are interconnected. The bus architecture may further link various other circuits such as a peripheral device, a voltage regulator, and a power management circuit. These are well known in the art, and therefore are not further described in this specification. A bus interface provides an interface. The transceiver 902 may be a plurality of components. To be specific, the transceiver 902 includes a transmitter and a receiver, and provides a unit configured to communicate with various other apparatuses on a transmission medium.

The processor 901 is responsible for bus architecture management and general processing. The memory 903 may store data used by the processor 901 when the processor 901 performs an operation.

An embodiment of the present disclosure further provides a computer-readable storage medium. The computer-readable storage medium stores a computer program, and when the computer program is executed by a processor, the processes of the foregoing method embodiment 400 and 500 are implemented and a same technical effect can be achieved. To avoid repetition, details are not described herein again. The computer-readable storage medium is, for example, a read-only memory (Read-Only Memory, ROM for short), a random access memory (Random Access Memory, RAM for short), a magnetic disk, or an optical disc.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of the present disclosure essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the above specific implementations, and the above specific implementations are only illustrative and not restrictive. Under the enlightenment of the present disclosure, those of ordinary skill in the art can make many forms without departing from the purpose of the present disclosure and the protection scope of the claims, all of which fall within the protection of the present disclosure.

The invention claimed is:

1. A positioning information processing method performed by a communication device, comprising:

determining, according to first positioning information of a terminal device and a measurement condition, whether to measure second positioning information of the terminal device, wherein the measurement condition comprises a releasing measurement condition;

the releasing measurement condition comprising at least one of: being less than or equal to a fourth relative displacement threshold, being less than or equal to a fourth relative velocity threshold, no change in a receive beam, no change in a strongest energy incoming beam, or no change in a signal.

2. The method according to claim 1, wherein the method further comprises determining, according to the first positioning information of the terminal device, whether to report the first positioning information.

3. The method according to claim 2, wherein before the determining whether to measure second positioning information of the terminal device, the method further comprises:

receiving the measurement condition and/or a reporting condition, wherein the measurement condition and/or the reporting condition are/is comprised in location request information.

4. The method according to claim 3, wherein determining, according to the first positioning information of the terminal device, whether to report the first positioning information comprises:

determining, according to the first positioning information of the terminal device and the reporting condition, whether to report the first positioning information.

5. The method according to claim 4, wherein the reporting condition comprises a triggering reporting condition and/or a releasing reporting condition, and the determining, according to the first positioning information of the terminal device and the reporting condition, whether to report the first positioning information comprises:

reporting the first positioning information in a case that the first positioning information of the terminal device meets the triggering reporting condition; or reporting the first positioning information in a case that the first positioning information of the terminal device does not meet the releasing reporting condition; or reporting the first positioning information in a case that the first positioning information of the terminal device meets the releasing reporting condition and a time interval between a current time and a time at which the first positioning information was last reported exceeds a first time threshold, and/or wherein the reporting the first positioning information in a case that the first positioning information of the terminal device does not meet the releasing reporting condition comprises: reporting the first positioning information in a case that the first positioning information of the terminal device is requested to be reported periodically and does not meet the releasing reporting condition.

6. The method according to claim 1, wherein the measurement condition further comprises a triggering measurement condition, and the determining, according to the first positioning information of the terminal device and the measurement condition, whether to measure the second positioning information of the terminal device comprises:

measuring the second positioning information in a case that the first positioning information of the terminal device meets the triggering measurement condition; or measuring the second positioning information in a case that the first positioning information of the terminal device does not meet the releasing measurement condition; or measuring the second positioning information in a case that the first positioning information of the terminal device meets the releasing measurement condition and a time interval between a current time and a time at which the second positioning information was last measured exceeds a second time threshold; and/or wherein the measuring the second positioning information in a case that the first positioning information of the terminal device does not meet the releasing measurement condition comprises:

measuring the second positioning information in a case that the first positioning information of the terminal device is requested to be measured periodically and does not meet the releasing measurement condition.

7. The method according to claim 5, wherein the triggering reporting condition comprises at least one of: being greater than or equal to a first relative displacement threshold, being greater than or equal to a first relative velocity threshold, being greater than or equal to a first relative angular velocity threshold, being greater than or equal to a first reference signal time difference (RSTD) threshold, being greater than or equal to a first reference signal received power (RSRP) threshold, being greater than or equal to a first receive-transmit (Rx-Tx) threshold, being greater than or equal to a first angle of arrival threshold, a change in a Wi-Fi node, a change in a Bluetooth node, a change in a receive beam, a change in a strongest energy incoming beam, or a change in a signal; and/or the releasing reporting condition comprises at least one of: being less than or equal to a second relative displacement threshold, being less than or equal to a second relative velocity threshold, being less than or equal to a second relative angular velocity threshold, being less than or equal to a second RSTD threshold, being less than or equal to a second RSRP threshold, being less than or equal to a second Rx-Tx threshold, being less than or equal to a second angle of arrival threshold, no change in a Wi-Fi node, no change in a Bluetooth node, no change in a receive beam, no change in a strongest energy incoming beam, or no change in a signal.

8. The method according to claim 6, wherein the triggering measurement condition comprises at least one of: being greater than or equal to a third relative displacement threshold, being greater than or equal to a third relative velocity threshold, being greater than or equal to a third relative angular velocity threshold, being greater than or equal to a third RSTD threshold, being greater than or equal to a third RSRP threshold, being greater than or equal to a third Rx-Tx threshold, being greater than or equal to a third angle of arrival threshold, a change in a Wi-Fi node, a change in a Bluetooth node, a change in a receive beam, a change in a strongest energy incoming beam, or a change in a signal; and/or the releasing measurement condition further comprises at least one of: being less than or equal to a fourth relative angular velocity threshold, being less than or equal to a fourth RSTD threshold, being less than or equal to a fourth RSRP threshold, being less than or equal to a fourth Rx-Tx threshold, being less than or equal to a fourth angle of arrival threshold, no change in a Wi-Fi node, no change in a Bluetooth node.

9. The method according to claim 3, wherein there is a correspondence between the first positioning information and/or the second positioning information and the measurement condition and/or the reporting condition; and/or wherein there is a correspondence between the measurement condition and/or the reporting condition and a positioning mode corresponding to a positioning manner of the terminal device, wherein the positioning mode corresponding to the positioning manner of the terminal device comprises at least one of a user equipment-based (UE-based) mode, a user equipment-assisted (UE-assisted) mode, and a standalone mode.

10. The method according to claim 9, wherein the measurement condition and/or the reporting condition are/is associated with a positioning manner of the terminal device, wherein the positioning manner of the terminal device comprises at least one of an assisted-global navigation satellite system (A-GNSS), an observed time difference of arrival (OTDOA), an enhanced cell identity (E-CID), sensor positioning, a wireless local area network (WLAN), Bluetooth, a transport block size (TBS), a downlink time difference of arrival (DL-TDOA), a downlink angle of departure (DL-AoD), a multi-radio transmission technology (Multi-RTT), a new radio enhanced cell identity (NR E-CID), an uplink time difference of arrival (UL-TDOA), or an uplink angle of arrival (UL-AoA); and/or wherein that the measurement condition and/or the reporting condition are/is associated with a positioning manner of the terminal device comprises at least one of the following association manners:

when the measurement condition and/or the reporting condition are/is being greater than or equal to at least one of a relative displacement threshold, a relative velocity threshold, and a relative angular velocity threshold, the associated positioning manner of the terminal device is at least one of sensor positioning, an A-GNSS, an OTDOA, and a DL-TDOA;

when the measurement condition and/or the reporting condition are/is being greater than or equal to an RSTD threshold, the associated positioning manner of the terminal device is an OTDOA or a DL TDOA;

when the measurement condition and/or the reporting condition are/is being greater than or equal to an RSRP threshold, the associated positioning manner of the terminal device is at least one of an OTDOA, an E-CID, a DL-TDOA, a DL-AoD, a Multi-RTT, an NR E-CID, and an UL-TDOA;

when the measurement condition and/or the reporting condition are/is being greater than or equal to an Rx-Tx threshold, the associated positioning manner of the terminal device is a Multi-RTT;

when the measurement condition and/or the reporting condition are/is being greater than or equal to an angle of arrival threshold, the associated positioning manner of the terminal device is an UL-AoA; or when the measurement condition and/or the reporting condition are/is a change in a receive beam, a change in a strongest energy incoming beam, or a change in a signal, the associated positioning manner of the terminal device is an AoD.

11. The method according to claim 3, wherein before the receiving a measurement condition and/or a reporting condition, the method further comprises:

sending positioning capability information, wherein the positioning capability information is used to indicate at least one of the following: whether triggering reporting is supported, whether releasing reporting is supported, whether triggering measurement is supported, or whether releasing measurement is supported.

12. The method according to claim 11, wherein in a case that the measurement condition and/or the reporting condition are/is associated with a positioning manner of the terminal device, the positioning capability information is used to indicate at least one of the following: whether the positioning manner of the terminal device supports triggering reporting, whether the positioning manner of the terminal device supports releasing reporting, whether the positioning manner of the terminal device supports triggering measurement, or whether the positioning manner of the terminal device supports releasing measurement; or wherein in a case that there is a correspondence between the measurement condition and/or the reporting condition and a positioning mode corresponding to a positioning manner of the terminal device, the positioning capability information is used to indicate at least one of the following: whether the positioning mode supports triggering reporting, whether the positioning mode supports releasing reporting, whether the positioning mode supports triggering measurement, or whether the positioning mode supports releasing measurement.

13. A positioning information processing method performed by a network device, comprising:

sending a measurement condition, the measurement condition comprising a releasing measurement condition and being configured to determine, according to first positioning information of a terminal device and a measurement condition, whether to measure second positioning information of the terminal device;

the releasing measurement condition comprising at least one of: being less than or equal to a fourth relative displacement threshold, being less than or equal to a fourth relative velocity threshold, no change in a receive beam, no change in a strongest energy incoming beam, or no change in a signal.

14. The method according to claim 13, wherein the method further comprises sending a reporting condition, the reporting condition comprising a triggering reporting condition and/or a releasing reporting condition, the method further comprising:

receiving first positioning information of a terminal device, wherein the first positioning information of the terminal device is reported in a case that the first positioning information meets the triggering reporting condition; or is reported in a case that the first positioning information does not meet the releasing reporting condition; or is reported in a case that the first positioning information of the terminal device is requested to be reported periodically and does not meet the releasing reporting condition; or is reported in a case that the first positioning information of the terminal device meets the releasing reporting condition and a time interval between a current time and a time at which the first positioning information was last reported exceeds a first time threshold; or wherein the measurement condition further comprises a triggering measurement condition, and the method further comprises:

receiving second positioning information of a terminal device, wherein the second positioning information of the terminal device is measured in a case that the first positioning information of the terminal device meets the triggering measurement condition; or is measured in a case that the first positioning information of the terminal device does not meet the releasing measurement condition; or is measured in a case that the first positioning information of the terminal device is requested to be measured periodically and does not meet the releasing measurement condition; or is measured in a case that the first positioning information of the terminal device meets the releasing measurement condition and a time interval between a current time and a time at which the second positioning information was last measured exceeds a second time threshold.

15. The method according to claim 14, wherein the triggering reporting condition comprises at least one of: being greater than or equal to a first relative displacement threshold, being greater than or equal to a first relative velocity threshold, being greater than or equal to a first relative angular velocity threshold, being greater than or equal to a first angle of arrival threshold, being greater than or equal to a first reference signal time difference (RSTD) threshold, being greater than or equal to a first reference signal received power (RSRP) threshold, being greater than or equal to a first receive-transmit (Rx-Tx) threshold, a change in a Wi-Fi node, a change in a Bluetooth node, a change in a receive beam, a change in a strongest energy incoming beam, or a change in a signal; and/or the releasing reporting condition comprises at least one of: being less than or equal to a second relative displacement threshold, being less than or equal to a second relative velocity threshold, being less than or equal to a second relative angular velocity threshold, being less than or equal to a second angle of arrival threshold, being less than or equal to a second RSTD threshold, being less than or equal to a second RSRP threshold, being less than or equal to a second Rx-Tx threshold, no change in a Wi-Fi node, no change in a Bluetooth node, no change in a receive beam, no change in a strongest energy incoming beam, or no change in a signal, wherein the triggering measurement condition comprises at least one of: being greater than or equal to a third relative displacement threshold, being greater than or equal to a third relative velocity threshold, being greater than or equal to a third relative angular velocity threshold, being greater than or equal to a third angle of arrival threshold, being greater than or equal to a third RSTD threshold, being greater than or equal to a third RSRP threshold, being greater than or equal to a third Rx-Tx threshold, a change in a Wi-Fi node, a change in a Bluetooth node, a change in a receive beam, a change in a strongest energy incoming beam, or a change in a signal; and/or the releasing measurement condition further comprises at least one of: being less than or equal to a fourth relative angular velocity threshold, being less than or equal to a fourth angle of arrival threshold, being less than or equal to a fourth RSTD threshold, being less than or equal to a fourth RSRP threshold, being less than or equal to a fourth Rx-Tx threshold, no change in a Wi-Fi node, no change in a Bluetooth node.

16. The method according to claim 14, wherein the reported first positioning information comprises reporting time information, and/or the second positioning information comprises measurement time information; and the method further comprises:

distinguishing, according to the reporting time information, a reporting condition corresponding to the first positioning information; and/or distinguishing, according to the measurement time information, a measurement condition corresponding to the second positioning information.

17. The method according to claim 14, wherein there is a correspondence between the first positioning information and/or the second positioning information and the measurement condition and/or the reporting condition; and/or wherein there is a correspondence between the measurement condition and/or the reporting condition and a positioning mode corresponding to a positioning manner of the terminal device, wherein the positioning mode corresponding to the positioning manner of the terminal device comprises at least one of a user equipment-based (UE-based) mode, a user equipment-assisted (UE-assisted) mode, and a standalone mode.

18. The method according to claim 14, wherein the measurement condition and/or the reporting condition are/is associated with a positioning manner of the terminal device, wherein the positioning manner of the terminal device comprises at least one of an assisted-global navigation satellite system (A-GNSS), an observed time difference of arrival (OTDOA), an enhanced cell identity (E-CID), sensor positioning, a wireless local area network (WLAN), Bluetooth, a transport block size (TBS), a downlink time difference of arrival (DL-TDOA), a downlink angle of departure (DL-AoD), a multi-radio transmission technology (Multi-RTT), an new radio enhanced cell identity (NR E-CID), an uplink time difference of arrival (UL-TDOA), or an uplink angle of arrival (UL-AoA); and/or wherein that the measurement condition and/or the reporting condition are/is associated with a positioning manner of the terminal device comprises at least one of the following association manners:

when the measurement condition and/or the reporting condition are/is being greater than or equal to at least one of a relative displacement threshold, a relative velocity threshold, or a relative angular velocity threshold, the associated positioning manner of the terminal device is at least one of sensor positioning, an A-GNSS, an OTDOA, or a DL-TDOA;

when the measurement condition and/or the reporting condition are/is being greater than or equal to an RSTD threshold, the associated positioning manner of the terminal device is an OTDOA or a DL TDOA;

when the measurement condition and/or the reporting condition are/is being greater than or equal to an RSRP threshold, the associated positioning manner of the terminal device is at least one of an OTDOA, an E-CID, a DL-TDOA, a DL-AoD, a Multi-RTT, an NR E-CID, or an UL-TDOA;

when the measurement condition and/or the reporting condition are/is being greater than or equal to an Rx-Tx threshold, the associated positioning manner of the terminal device is a Multi-RTT;

when the measurement condition and/or the reporting condition are/is being greater than or equal to an angle of arrival threshold, the associated positioning manner of the terminal device is an UL-AoA; and when the measurement condition and/or the reporting condition are/is a change in a receive beam, a change in a strongest energy incoming beam, or a change in a signal, the associated positioning manner of the terminal device is an AoD.

19. The method according to claim 14, wherein before the sending a measurement condition and/or a reporting condition, the method further comprises:

sending positioning capability information, wherein the positioning capability information is used to indicate at least one of the following: whether triggering reporting is supported, whether releasing reporting is supported, whether triggering measurement is supported, or whether releasing measurement is supported; and/or receiving positioning capability information, wherein the positioning capability information is used to indicate at least one of the following: whether triggering reporting is supported, whether releasing reporting is supported, whether triggering measurement is supported, or whether releasing measurement is supported.

20. The method according to claim 19, wherein in a case that the measurement condition and/or the reporting condition are/is associated with a positioning manner of a terminal device, the positioning capability information is used to indicate at least one of the following: whether the positioning manner of the terminal device supports triggering reporting, whether the positioning manner of the terminal device supports releasing reporting, whether the positioning manner of the terminal device supports triggering measurement, or whether the positioning manner of the terminal device supports releasing measurement; or wherein in a case that there is a correspondence between the measurement condition and/or the reporting condition and a positioning mode corresponding to a positioning manner of a terminal device, the positioning capability information is used to indicate at least one of the following: whether the positioning mode supports triggering reporting, whether the positioning mode supports releasing reporting, whether the positioning mode supports triggering measurement, or whether the positioning mode supports releasing measurement.

* * * * *